United States Patent
Nammi et al.

(10) Patent No.: US 9,374,210 B2
(45) Date of Patent: *Jun. 21, 2016

(54) METHOD, APPARATUS AND SYSTEM FOR USING COMMON AND DEMODULATION PILOT SIGNALS IN MULTI-ANTENNA WIRELESS COMMUNICATIONS

(71) Applicant: Telefonaktiebolaget L M Ericsson (publ), Stockholm (SE)

(72) Inventors: Sairamesh Nammi, Kista (SE); Thomas Chapman, Stockholm (SE); Bo Göransson, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/729,135

(22) Filed: Jun. 3, 2015

(65) Prior Publication Data

US 2015/0270937 A1 Sep. 24, 2015

Related U.S. Application Data

(60) Continuation of application No. 14/486,269, filed on Sep. 15, 2014, now Pat. No. 9,077,417, which is a division of application No. 13/818,640, filed as application No. PCT/SE2013/050054 on Jan. 24, 2013, now Pat. No. 8,891,646.

(60) Provisional application No. 61/592,151, filed on Jan. 30, 2012.

(51) Int. Cl.
*H04K 1/10* (2006.01)
*H04L 27/28* (2006.01)
(Continued)

(52) U.S. Cl.
CPC ............ *H04L 5/0048* (2013.01); *H04B 7/0417* (2013.01); *H04B 7/0456* (2013.01);
(Continued)

(58) Field of Classification Search
CPC ..... H04L 5/0048; H04L 5/005; H04L 5/0051; H04L 25/0206; H04L 25/0226; H04B 7/0619; H04B 7/0684; H04B 7/0456; H04B 7/0617; H04B 7/0626; H04B 7/0417; H04B 7/0486; H04B 7/08
USPC .................................. 375/260, 267, 346, 347
See application file for complete search history.

(56) References Cited

U.S. PATENT DOCUMENTS 6,574,267 B1 * 6/2003 Kanterakis ............. H04B 1/707
370/342
8,199,843 B2 6/2012 Kwak et al.
(Continued)

OTHER PUBLICATIONS

3GPP, "3rd Generation Partnership Project; Technical Specification Group Radio Access Network; Physical channels and mapping of transport channels onto physical channels (FDD) (Release 11)", 3GPP TS 25.211 V11.1.0, Sep. 2012, 1-62.

(Continued)

*Primary Examiner* — Phuong Phu
(74) *Attorney, Agent, or Firm* — Patent Portfolio Builders, PLLC

(57) ABSTRACT

Multiple antennas employed at transmitting and receiving nodes can significantly increase a MIMO system capacity, especially when channel knowledge of link(s) between the transmitting and receiving nodes is available at the transmitting node. Channel knowledge may be acquired through feedback provided by the receiving node based on a plurality of common pilots transmitted by the transmitting node. The common pilots may include legacy and non-legacy pilots. If the feedback indicates that data demodulation at the receiving node can be enhanced, the transmitting node may also transmit demodulation pilot signal(s), which may coincide with the transmission of data. The receiving node can use the demodulation pilot signal(s), alone or with the common pilot signal(s), to demodulate data received from the transmitting node. The transmitting node may notify the receiving node to monitor for the demodulation pilot signal(s) through higher layer signaling and/or scheduling orders over a control channel.

15 Claims, 14 Drawing Sheets

(51) Int. Cl.
   *H04L 5/00*     (2006.01)
   *H04B 7/06*     (2006.01)
   *H04L 25/02*    (2006.01)
   *H04B 7/04*     (2006.01)
   *H04B 7/08*     (2006.01)

(52) U.S. Cl.
   CPC ............ *H04B 7/0486* (2013.01); *H04B 7/0617* (2013.01); *H04B 7/0619* (2013.01); *H04B 7/0626* (2013.01); *H04B 7/0684* (2013.01); *H04B 7/08* (2013.01); *H04L 5/005* (2013.01); *H04L 5/0051* (2013.01); *H04L 25/0206* (2013.01); *H04L 25/0226* (2013.01)

(56) References Cited

U.S. PATENT DOCUMENTS

| | | | |
|---|---|---|---|
| 8,369,450 | B2 | 2/2013 | Khan et al. |
| 8,599,711 | B2 * | 12/2013 | Hugl ............... H04W 24/10 370/252 |
| 8,737,247 | B1 | 5/2014 | Moshavi et al. |
| 8,750,402 | B2 * | 6/2014 | Lee ............... H04B 7/0413 375/267 |
| 8,891,646 | B2 * | 11/2014 | Nammi ............ H04B 7/0619 370/249 |
| 8,923,423 | B2 | 12/2014 | Molnar et al. |
| 9,077,417 | B2 * | 7/2015 | Nammi ............ H04B 7/0619 |
| 2007/0070944 | A1 | 3/2007 | Rinne et al. |
| 2009/0016461 | A1 * | 1/2009 | Jitsukawa ........ H04B 7/04 375/267 |
| 2009/0310715 | A1 | 12/2009 | Cairns et al. |
| 2010/0061472 | A1 | 3/2010 | Molnar et al. |
| 2012/0039282 | A1 * | 2/2012 | Kim ............... H04W 52/54 370/329 |
| 2012/0082192 | A1 | 4/2012 | Pelletier et al. |
| 2012/0224555 | A1 * | 9/2012 | Lee ............... H04W 52/143 370/329 |
| 2013/0114498 | A1 * | 5/2013 | Park ............... H04W 4/06 370/312 |

OTHER PUBLICATIONS

Unknown, Author, "4-branch MIMO for HSDPA", Ericsson, 3GPP TSG RAN WG1 Meeting #65, R1-111763, Barcelona, Spain, May 9-11, 2011, 1-17.

Unknown, Author, "Common Pilot Design for Four branch MIMO System", Ericsson, 3GPP TSG RAN WG1 Meeting #68, R1-120810, Dresden, Germany, Feb. 6-10, 2012, 1-11.

Unknown, Author, "Common Pilot Design for Four branch MIMO System", Ericsson, ST-Ericsson, 3GPP TSG RAN WG1 Meeting #68, R1-120352, Dresden, Germany, Feb. 6-10, 2012, 1-11.

Unknown, Author, "Initial discussion on pilot design for 4-branch MIMO", Ericsson, ST-Ericsson, 3GPP TSG RAN WG1 Meeting #66bis, R1-113431, Zhuhai, P.R. China, Oct. 10-14, 2011, 1-4.

Unknown, Author, "Initial evaluation results for pilot design", Huawei, HiSilicon, 3GPP TSG-RAN WG1 Meeting #67, R1-113846, San Francisco, USA, Nov. 14-18, 2011, 1-7.

Unknown, Author, "Introduction of 4Tx_HSDPA in 25.211, Change Request", Ericsson, 3GPP TSG-RAN1 Meeting #71, R1-125212, New Orleans, USA, Nov. 12-16, 2012, 1-11.

Unknown, Author, "Introduction of 4Tx_HSDPA in 25.214, Change Request", Ericsson, 3GPP TSG-RAN WG1 Meeting #71, R1-125361, New Orleans, USA, Nov. 12-16, 2012, 1-31.

Unknown, Author, "New WI: Four Branch MIMO transmission for HSDPA, Core Part", Ericsson, 3GPP TSG-RAN meeting #53, RP-111393, Fukuoka, Japan, Sep. 13-16, 2011, 1-6.

Unknown, Author, "New WI: Four Branch MIMO transmission for HSDPA, Feature Part", Ericsson, 3GPP TSG-RAN meeting #53, RP-111393, Fukuoka, Japan, Sep. 13-16, 2011, 1-5.

Unknown, Author, "New WI: Four Branch MIMO transmission for HSDPA, Performance Part", Ericsson, 3GPP TSG-RAN meeting #53, RP-111393, Fukuoka, Japan, Sep. 13-16, 2011, 1-5.

Unknown, Author, "On the pilot design for 4-branch MIMO", Alcatel-Lucent, Alcatel-Lucent Shanghai Bell, 3GPP TSG-RAN WG1 Meeting #67, R1-114034, San Francisco, USA, Nov. 14-18, 2011, 1-2.

Unknown, Author, "Pilot design for 4-Branch MIMO", Ericsson, ST-Ericsson, 3GPP TSG-RAN WG1 #67, R1-114291, San Francisco, CA, USA, Nov. 14-18, 2011, 1-6.

Unknown, Author, "Pilot design for DL 4-branch MIMO", Huawei, HiSilicon, 3GPP TSG-RAN WG1 Meeting #66bis, R1-112978, Zhuhai, China, Oct. 10-14, 2011, 1-6.

Unknown, Author, "Pilot design for four branch MIMO transmission for HSDPA", InterDigital Communications, LLC, 3GPP TSG-RAN WG1 Meeting #67, R1-114172, San Francisco, CA, USA, Nov. 14-19, 2011, 1-3.

Unknown, Author, "Pilot design options for 4-Tx MIMO for HSDPA", Nokia Siemens Networks, Nokia, 3GPP TSG RAN WG1 Meeting #66bis, R1-113410, Zhuhai, China, Oct. 10-14, 2011, 1-3.

Unknown, Author, "Reply LS on FDD/TDD and HRPD/CDMA2000 RRM tests", 3GPP TSG-RAN Meeting #54, RP-111763, Berlin, Germany, Feb. 6-9, 2011, 1-1.

* cited by examiner

METHOD, APPARATUS AND SYSTEM FOR USING COMMON AND DEMODULATION PILOT SIGNALS IN MULTI-ANTENNA WIRELESS COMMUNICATIONS

RELATED APPLICATION

This application claims priority to co-pending U.S. application Ser. No. 14/486,269, filed 15 Sep. 2014, which is a continuation of U.S. application Ser. No. 13/818,640, filed 22 Feb. 2013, which is a national stage entry of International Patent Application PCT/SE13/50054, filed 24 Jan. 2013, which claims priority to U.S. Provisional Application Ser. No. 61/592,151, titled "METHOD AND APPARATUS FOR SELECTIVELY USING COMMON AND DEDICATED PILOT SIGNALS IN MULTI-ANTENNA RADIO COMMUNICATIONS" and filed on Jan. 30, 2012. The entire contents of each of the aforementioned applications are incorporated herein by reference.

TECHNICAL FIELD

The technical field of the present disclosure generally relates to wireless communications. In particular, the technical field relates to methods, apparatuses, and/or systems for selectively using demodulation pilot signals in wireless communications to enhance demodulation performances.

BACKGROUND

A MIMO (multiple input multiple output) system can increase the performance and communication capacity of a wireless communication system. MIMO employs multiple transmission antennas and multiple reception antennas to enhance data transmission and/or reception efficiency, and hence, is also called a multiple antenna system. MIMO techniques include spatial multiplexing, transmit diversity, beamforming, and the like.

In spatial multiplexing, independent symbol streams are transmitted in the same frequency bandwidth on different antennas of a transmitting node such as a base station (e.g., BTS, eNodeB, eNB, etc.) This allows data to be transmitted at high rates without increasing bandwidth of the system. In transmit diversity, the same data is transmitted from transmission antennas. By using space-time codes at the transmitting node, reliability of the detected symbols at a receiving node (e.g., UE) can be improved by exploiting transmit diversity. Beamforming is typically used to increase SINR (signal to interference plus noise ratio) of a signal by adding weight values according to channel states at multiple antennas. The weight values may be represented by a weight vector or a weight matrix, and is also referred to as a precoding vector or a precoding matrix.

In practical wireless systems such as the 3GPP (3rd Generation Partnership Project) LTE (Long Term evolution), UMTS (Universal Mobile Telecommunications System), HSDPA (High Speed Downlink Packet Access) and WiMax (Worldwide Interoprability for Microwave Access) systems, knowledge of the channel or channels between the transmitting node and the receiving node is used to enhance performances. The channel knowledge can be made available at the transmitting node via feedback from the receiving node to the transmitting node. A MIMO (Multiple Input Multiple Output) transmitting node can utilize this channel information to improve the system performance with the aid of precoding. In addition to beam forming gain, the use of precoding avoids the problem of ill-conditioned channel matrix.

In wireless systems such as the HSDPA, UMTS and LTE, multiple antennas with precoding and/or beamforming technology can be adopted to provide high data rates to the UEs (user equipment). In these systems, the base station transmits one or more predetermined signals known in advance by UEs. These known signals are sometimes referred to as pilot signals (e.g., in UMTS) or as reference signals (e.g., in LTE). For example, in LTE Release 10, up to 8 UE-specific reference signals, called demodulation reference signals (DM-RS) are introduced for the purpose of channel demodulation. These reference signals are inserted at predetermined positions in the OFDM time-frequency grid and allow a UE to estimate the downlink channel so that it may carry out coherent channel demodulation. For ease of description, such known signals are referred to as pilot signals or simply pilots.

Another MIMO function for pilot signals transmitted by the base station is for the UE to detect the pilot signal, and based on the detected pilot signal, feed back to the base station an estimate of CSI (Channel State Information). CSI refers to known channel properties of a communication link describing how a signal propagates from the transmitting node to the receiving node and represents the combined effect of, for example, scattering, fading, and power decay with distance. Based on the CSI estimate, the base station can adapt downlink transmissions to current channel conditions, which is important for reliable communication with high data rates in multi-antenna systems. Each MIMO channel between the base station and the UE needs its own CSI estimate.

In practice, complete CSI may be difficult to obtain, e.g., for a FDD (frequency division duplex) system. In such a system, some kind of CSI knowledge may be available at the transmitting node via the feedback from the receiving node. These systems are called limited feedback systems. There are many implementations of limited feedback systems such as codebook based feedback and quantized channel feedback. 3GPP LTE, HSDPA and WiMAX recommend codebook based feedback CSI for precoding.

In a codebook based precoding, predefined codebook is defined both at the transmitting and receiving nodes. Entries of the codebook can be constructed using different methods such as Grassmannian, Lyod algorithm, DFT matrix etc. The precoder matrix is often chosen to match the characteristics of the $N_R \times N_T$ MIMO channel matrix H ($N_R$ being the number of receive antennas at the receiving node and $N_T$ being the number of transmit antennas at the transmitting node), resulting in a so called channel dependent precoding. This is also commonly referred to as closed-loop precoding and essentially strives for focusing the transmit energy into a signal subspace which is strong in the sense of conveying much of the transmitted energy to the UE. The signal subspace in this context is a subspace of a signal space that is defined in any number of dimensions including space, time, frequency, code, etc.)

In addition, the precoder matrix may also be selected to strive for orthogonalizing the channel, meaning that after proper linear equalization at the UE, the inter-layer interference is reduced. At the receiving node, it is common to find SINR with different codebook entries and choose the rank and/or precoding index which gives the highest spectral efficiency (also referred to as channel capacity). In this context, rank indicates the number of data streams that can be simultaneously transmitted from a transmitting node to a receiving node.

The performance of a closed-sloop MIMO system generally improves with the cardinality (size) of the codebook set. At the receiving node, RI (rank information) and PCI (precoding control index) are sent back to the transmitting node every TTI (transmission time interval) or multiples of TTI (for example 5 in LTE, ⅓ in HSDPA).

Existing UMTS, LTE, and other systems (e.g., WiMax, 802.11(n), etc.) support up to 2×2 MIMO transmissions (max $N_R$=2, max $N_T$=2) which means that the base station must obtain two channel pilots to estimate or characterize each of the two spatial layers. In order to support 4×4 MIMO transmissions, the base station must obtain four channel pilots in order to estimate or characterize each of the four spatial layers. As compared to existing or legacy LTE systems, two new pilot signals must be defined to perform the channel demodulation and CSI estimation for the two new MIMO channels.

SUMMARY

A non-limiting aspect of the disclosed subject matter is directed to a method performed by a transmitting node of a wireless communication system, in which the transmitting node may be capable of multi-antenna transmission. The transmitting node may perform the method by transmitting a plurality of common pilot signals from a plurality of antennas; determining whether a data demodulation at a receiving node can be enhanced; transmitting data to the receiving node during a data transmission time; and transmitting one or more demodulation pilot signals to the receiving node when it is determined that the data demodulation at the receiving node can be enhanced. Each common pilot signal may be transmitted from one antenna of the transmitting node in which no antenna transmits more than one common pilot signal. The plurality of common pilot signals may include one or more legacy common pilot signals and one or more non-legacy common pilot signals in which each legacy common pilot signal is transmitted at a higher power than each non-legacy common pilot signal. Each legacy common pilot signal may be understood by both legacy receiving nodes and non-legacy receiving nodes. Each non-legacy common pilot signal may be understood by non-legacy receiving nodes but may not be understood by legacy receiving nodes.

Another non-limiting aspect of the disclosed subject matter is directed to a computer-readable medium which includes therein programming instructions. When a computer executes the programming instructions, the computer executes the method performed in a transmitting node to provide channel state information as feedback to a transmitting node in a multi-antenna wireless communication system as described above.

Another non-limiting aspect of the disclosed subject matter is directed to a transmitting node of a wireless communication system. The transmitting node may be capable of multi-antenna transmission, and may comprise a pilot transmitting node, a configuration provider, and a data transmitting node. The pilot transmitting node may be structured to transmit a plurality of common pilot signals from a plurality of antennas. The configuration provider may be structured to determine whether a data demodulation at a receiving node can be enhanced. The data transmitting node may be structured to transmit data to the receiving node during a data transmission time. The pilot transmitting node may also be structured to transmit one or more demodulation pilot signals to the receiving node when the configuration provider determines that the data demodulation at the receiving node can be enhanced. The transmitting node may be structured to transmit each common pilot signal from one antenna in which no antenna transmits more than one common pilot signal. The plurality of common pilot signals may include one or more legacy common pilot signals and one or more non-legacy common pilot signals in which each legacy common pilot signal is transmitted at a higher power than each non-legacy common pilot signal. Each legacy common pilot signal may be understood by both legacy receiving nodes and non-legacy receiving nodes. Each non-legacy common pilot signal may be understood by non-legacy receiving nodes but may not be understood by legacy receiving nodes.

A non-limiting aspect of the disclosed subject matter is directed to a method performed by a receiving node of a wireless communication system, in which the receiving node may be capable of multi-antenna reception. The receiving node may perform the method by receiving a plurality of common pilot signals from a transmitting node; determining whether or not data demodulation can be enhanced at the receiving node; receiving one or more demodulation pilot signals and one or more demodulation pilot signals from the transmitting node when it is determined that the data demodulation at the receiving node can be enhanced, receiving data from the transmitting node during a data reception time; and demodulating the received data based on the demodulation pilot signal(s) and the common pilot signal(s) when the demodulation pilot signal(s) are received. Each common pilot signal may be transmitted from one antenna of the transmitting node in which no antenna transmits more than one common pilot signal. The plurality of common pilot signals may include one or more legacy common pilot signals and one or more non-legacy common pilot signals in which each legacy common pilot signal is transmitted at a higher power than each non-legacy common pilot signal. Each legacy common pilot signal may be understood by both legacy receiving nodes and non-legacy receiving nodes. Each non-legacy common pilot signal may be understood by non-legacy receiving nodes but may not be understood by legacy receiving nodes.

Another non-limiting aspect of the disclosed subject matter is directed to a computer-readable medium which includes therein programming instructions. When a computer executes the programming instructions, the computer executes the method performed in a transmitting node to provide channel state information as feedback to a transmitting node in a multi-antenna wireless communication system as described above.

Another non-limiting aspect of the disclosed subject matter is directed to a receiving node of a wireless communication system. The receiving node may be capable of multi-antenna reception, and may comprise a pilot receiving node, a configuration setter, and a data receiving node. The pilot receiving node may be structured to receive a plurality of common pilot signals from a transmitting node. The configuration setter may be structured to determine whether or not data demodulation can be enhanced at the receiving node. The data receiving node may be structured to receive data from the transmitting node during a data reception time. The pilot receiver may also be structured to receive one or more demodulation pilot signals and one or more common pilot signals from the transmitting node when the configuration setter determines that the data demodulation at the receiving node can be enhanced. The data receiver may also be structured to demodulate the received data based on the demodulation pilot signal(s) and the common pilot signal(s) when the demodulation pilot signal(s) are received. Each common pilot signal may be transmitted from one antenna of the transmitting node in which no antenna transmits more than one common pilot signal. The plurality of common pilot signals may include one or more legacy common pilot signals and one or more non-legacy common pilot signals in which each legacy common pilot signal is transmitted at a higher power than each non-legacy common pilot signal. Each legacy common pilot signal may be understood by both legacy receiving nodes and non-legacy receiving nodes. Each non-legacy common pilot signal may be understood by non-legacy receiving nodes but may not be understood by legacy receiving nodes.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

Figure 1:
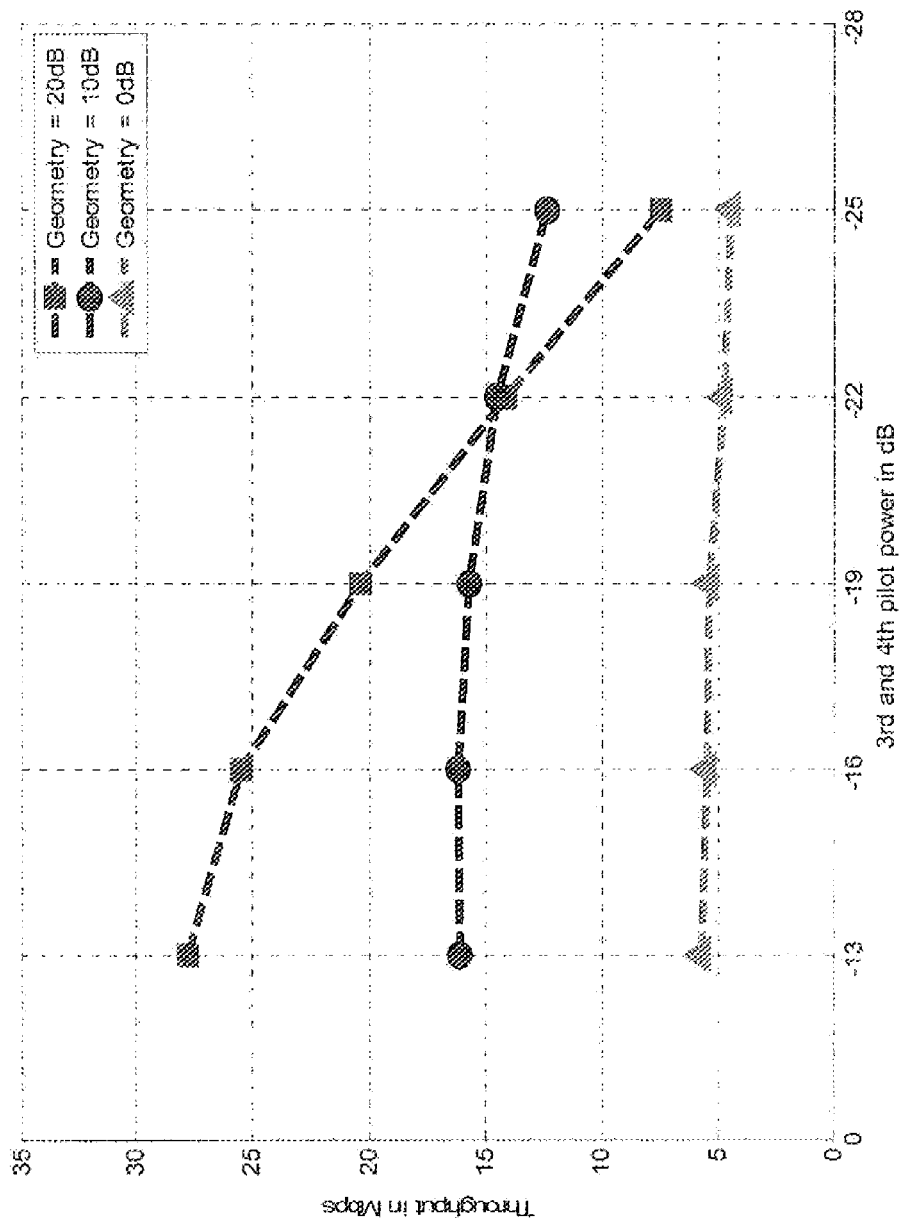
FIG. 1 graphically illustrates link level performances of a 4×4 MIMO capable UE when different pilot powers are used for different pilot signals.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed.

Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer should be generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

A cell is associated with a base station, where a base station comprises in a general sense any node transmitting radio signals in the downlink (DL) and/or receiving radio signals in the uplink (UL). As mentioned above, example base stations are a NodeB, eNodeB, eNB, macro/micro/pico radio base station, home eNodeB, relay, repeater, sensor, transmitting-only radio nodes or receiving-only radio nodes. A base station may operate or at least perform measurements in one or more frequencies, carrier frequencies or frequency bands and may be capable of carrier aggregation. It may also be a single-radio access technology (RAT), muti-RAT, or multi-standard node, e.g., using the same or different base band modules for different RATs.

Although the description is given for UEs, it should be understood by the skilled in the art that "UE" is a non-limiting term comprising any wireless device or node equipped with a radio interface allowing for at least one of: transmitting signals in UL and receiving and/or measuring signals in DL. Some examples of UE in its general sense are PDA, laptop, mobile, sensor, fixed relay, mobile relay, a radio network node (e.g., an LMU or a femto base station or a small base station using the terminal technology). A UE herein may comprise a UE (in its general sense) capable of operating or at least performing measurements in one or more frequencies, carrier frequencies, component carriers or frequency bands. It may be a "UE" operating in single-RAT or multi-RAT or multi-standard mode (e.g., an example dual-mode UE may operate with any one or combination of WiFi and LTE).

The signaling described may either be via direct links or logical links (e.g. via higher layer protocols and/or via one or more network nodes). For example, signaling from a coordinating node may pass another network node, e.g., a radio node.

Embodiments described herein may be considered as independent embodiments or may be considered in any combination with each other to describe non-limiting examples.

In this document, 3GPP terminologies—e.g., HSDPA, WCDMA, LTE, LTE-A—are used as examples for explanation purposes. Note that the technology described herein can be applied to non-3GPP standards, e.g., WiMAX, UMB, GSM, cdma2000, 1xEVDO, Wireless LAN, WiFi, etc. Thus, the scope of this disclosure is not limited to the set of 3GPP wireless network systems and can encompass many domains of wireless communication systems. Also, a wireless terminal (e.g., UE, laptop, PDA, smart phone, mobile terminal, etc.) will be used as an example of a receiving node in which the described method can be performed. That is, the descriptions generally will focus on the downlink transmissions. However, the subject matter is equally applicable to uplink transmissions. That is, the disclosed subject matter is applicable to any node of the network including base stations (e.g., RBS, NodeB, eNodeB, eNB, etc.) and relay stations that receive wireless signals.

As indicated above, many existing systems support at most up to 2×2 MIMO transmissions (referred to as "legacy" system for convenience). To support 4×4 MIMO transmissions (referred to as "non-legacy" system for convenience), two new pilot signals—$3^{rd}$ and $4^{th}$ pilot signals—are defined to perform the channel demodulation and CSI estimation for the additional MIMO channels.

To the legacy UEs, the $3^{rd}$ and $4^{th}$ pilot signals are undesirable. First, the energy made available in the $3^{rd}$ and $4^{th}$ pilots reduces the amount of energy available for HS-PDSCH scheduling to the legacy UEs. Second, the $3^{rd}$ and $4^{th}$ pilots can cause interference to the legacy UEs which at best can make use of the $1^{st}$ and $2^{nd}$ pilots. Therefore, to minimize performance impacts to the legacy UEs (non 4Tx UEs), it is desirable that the power of the $3^{rd}$ and $4^{th}$ pilots be reduced to a low value. Hence, the $1^{st}$ and $2^{nd}$ pilots may be transmitted at relative high powers (e.g., −10 dB, −13 dB, respectively) and the $3^{rd}$ and $4^{th}$ pilots may be transmitted at relatively low powers (e.g., −22 dB).

However, if the powers of the $3^{rd}$ and $4^{th}$ pilots are minimal, then the demodulation performance of 4Tx UEs can be adversely impacted. FIG. 1 illustrates an example of link level throughputs as a function of pilot powers on $3^{rd}$ and $4^{th}$ pilots for a non-legacy UE with three different geometries for a 4×4 MIMO system. Higher geometry such as 20 dB indicates that the environment the UE is in is a relatively clean (high C/I (carrier to interference ratio)) and lower geometry such as 0 dB indicates that the UE is in an environment that is relatively dirty or noisy. In this figure, the pilot powers for the $1^{st}$ and $2^{nd}$ pilots are assumed to be maintained at −10 and −13 dB, respectively.

It can be observed that as the $3^{rd}$ and $4^{th}$ pilot powers are reduced, the performance of the non-legacy UE degrades. The degradation is severe at high geometries (e.g., at 20 dB). This is because at high geometries, there is a high probability of rank 3 and rank 4 transmissions and/or high data rates, which require a larger amount of pilot power energy. On the other hand, low data rates and/or rank selections (e.g., ranks 1 and 2), which occur at low geometries (e.g., 0 dB) can be demodulated with a lower amount of pilot energy. Thus, high pilot power is desirable when the 4Tx UE is to demodulate high data rates with high rank.

Typically, each pilot signal is transmitted on a corresponding antenna port. Thus, a 4Tx transmitting node can transmit $1^{st}$, $2^{nd}$, $3^{rd}$ and $4^{th}$ pilot signals on corresponding $1^{st}$, $2^{nd}$, $3^{rd}$ and $4^{th}$ antenna ports. In an aspect of the disclosed subject matter, it is proposed that the pilot powers transmitted from the $3^{rd}$ and/or $4^{th}$ antenna ports be increased when circumstances warrant. For example, the pilot powers from the $3^{rd}$ and/or $4^{th}$ antenna ports may be increased when:

The UE is a non-legacy UE (i.e., capable of making use of the pilot signals transmitted from the $3^{rd}$ and/or the $4^{th}$ antenna ports); and The UE is to demodulate data at high rates (such as when the UE is in a relatively clean environment (high geometry)).

On the other hand, following are examples of scenarios where the pilot powers from the $3^{rd}$ and $4^{th}$ antenna ports can be reduced:

When the UE is a legacy UE;

When the UE is at a low rank (e.g., rank 1 or 2);

When the UE is scheduled for low data rates (e.g., voice).

In one or more aspects, it is proposed that the powers of pilot signals transmitted from the $3^{rd}$ and $4^{th}$ antenna ports be increased or decreased as circumstances warrant. In one aspect, a transmitting node may determine one or more conditions associated with a communication with a receiving node. Based on that determined condition, the receiving node may be configured to receive one or both of common and demodulation pilot (or reference) signals transmitted from the transmitting node. In one instance, the receiving node may be configured to receive only the common pilot signals. In another instance, the receiving node may be configured to receive both the common and demodulation pilot signals. In one embodiment, the transmitting node may configure the receiving node, and in another embodiment, the receiving node may configure itself.

By configuring the receiving node to selectively monitor one or both of the common and demodulation pilot signals, a desired demodulation performance can be achieved at the receiving node while at the same time reducing or minimizing interference to other radio nodes that may not have the same configuration and/or capabilities as the receiving node, e.g., legacy UEs.

An advantageous example application is to a MIMO communication between a radio network node such as a base station and a UE. Non-limiting examples of the one or more conditions includes one or more of the following: a MIMO rank associated with the MIMO communication, a signal quality associated with the UE (e.g., geometry, S(I)NR, path loss, etc.), and/or a data rate associated with the MIMO communication.

In one example embodiment, the UE may be configured to use common pilots at a power level that permits the UE to perform a desired data demodulation and estimation of CSI to be fed back to the radio network node. In another example embodiment, the UE may be configured to use one or more demodulation pilots for data demodulation and one or more common pilots for estimation of CSI to be fed back to the radio network node.

In yet another example embodiment, the UE may be configured to receive one or more demodulation pilots on one or more antennas and a common pilot on one or more other antennas. The demodulation pilot signal(s) may be used for demodulation, while the common pilot signal(s) alone or in combination with the demodulation pilot signal(s) may be used for CSI estimation.

The receiving node (e.g., UE in downlink) may be configured by the radio network node in a variety of ways. Non-limiting examples include via suitable existing and/or new signaling from the radio transmitting and/or network node such as radio resource control (RRC) signaling or control channel flag bit(s) such as an High Speed Shared Control Channel (HS-SCCH) order.

Figure 3:
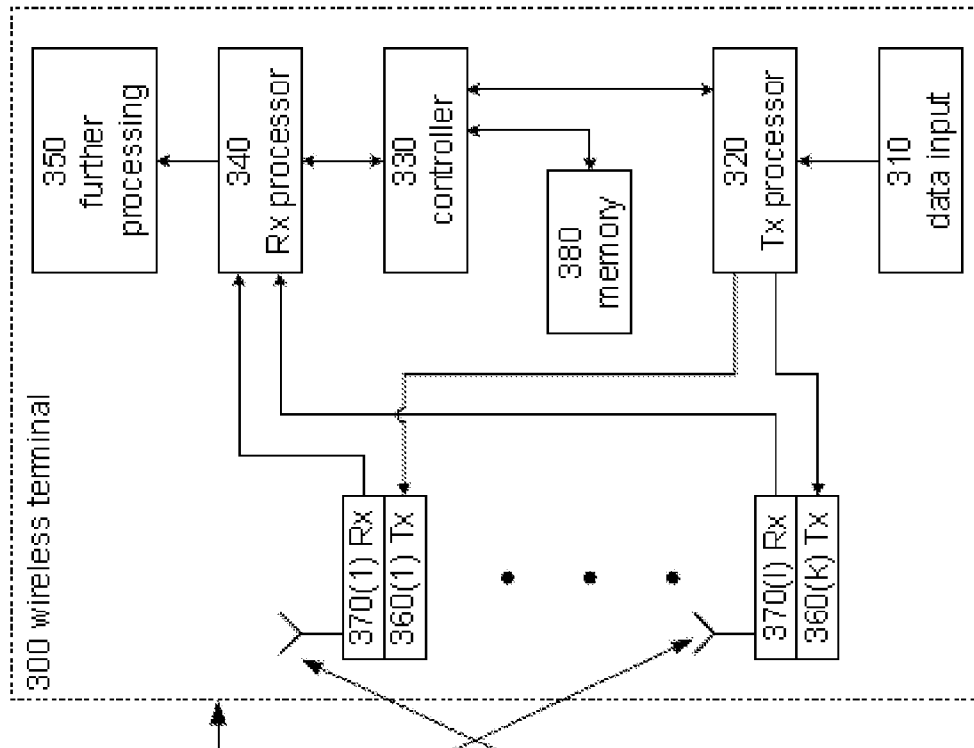
FIGS. 2 and 3 respectively illustrate example block diagrams of a radio base station and a wireless terminal.
Figure 2:
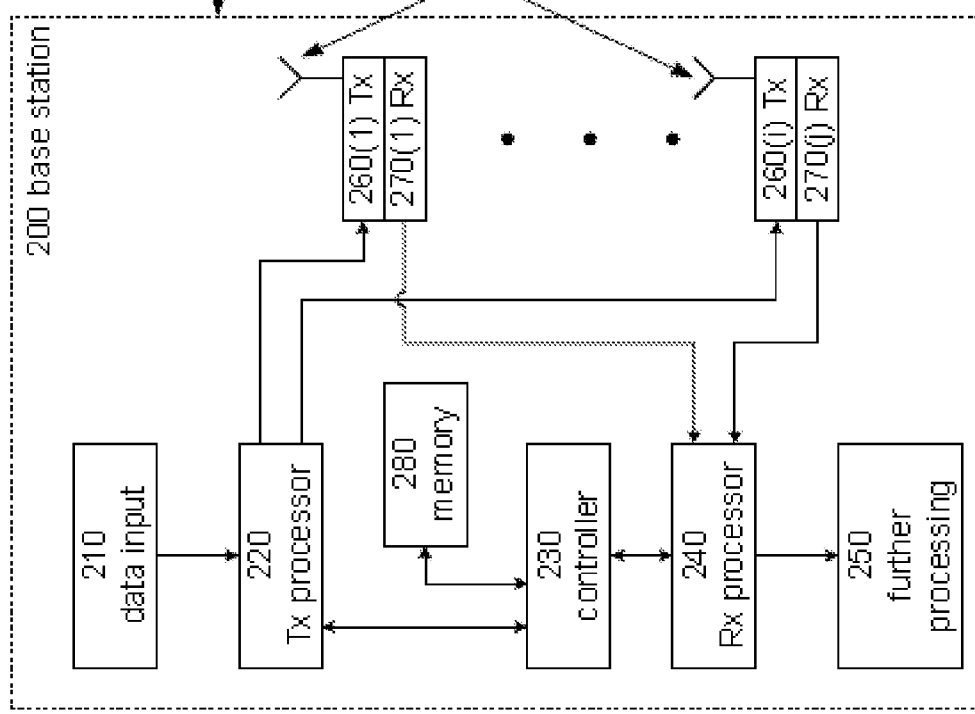

FIGS. 2 and 3 illustrate example block diagrams of a base station 200 (an example of a radio transmitting node) and a UE 300 (an example of a radio receiving node) that are both MIMO capable according to an aspect of the disclosed subject matter. The base station 200 may be structured to signal directly to the UE 300 whether MIMO should be turned on or off for the UE 300 and/or the UE 300 may be structured to be capable of making that decision. The former may be accomplished by introducing physical layer signaling between the base station 200 and the UE 300 where the base station 200 configures the UE 300 to activate/deactivate some or all MIMO related features.

The base station 200 may include a data input 210, and a transmit (Tx) processor 220 structured to receive data from the data input 210 and to process the data into transmittable data over different transmitters 260(1)-260(i). The Tx processor 220 may be structured to demultiplex data, signaling, and pilot symbols into multiple streams, and these are fed to the plurality of transmitters 260(1)-260(i) in accordance with a particular MIMO-mode, e.g., 2Tx, 4Tx, etc. The base station 200 can further include a number of receivers 270(1)-270(j) arranged to receive data from the UE 300. The received data may be transferred to a receive (Rx) processor 240 structured to detect the MIMO mode of the received signal and to recover feedback information and traffic data sent by UE 300. The Rx processor 240 may also be structured to perform further processing 250 on the received data in any desired manner and/or can output the data for further processing 250. A controller 230 may be structured to control the different devices within the base station 200 with a memory 280 for storing program codes and data. The controller 230 may be structured to determine, based on one or more conditions or parameters, which can be received for example from a radio network controller (RNC), the UE 300, or internally, a desired pilot configuration for the UE 300 best suited for the MIMO mode and the one or more determined conditions or parameters.

Each of the components of the base station 200—data input 210, Tx processor 220, controller 230, Rx processor 240, further processor 250, transmitters 260(1)-260(i), receivers 270(1)-270(j), and memory 280—may be implemented in hardware, software (including firmware), or in combination of hardware and software such that the base station 200 as a whole is implemented in hardware or in a combination of hardware and software.

The UE 300 may include a data input 310 structured to provide data to be transmitted by processing the data in a Tx processor 320. The data may be modulated and split up in accordance with a MIMO-mode and transferred to a plurality of transmitters 360(1)-360(k). The UE 300 may send feedback information, including CQI (as well as perhaps other information such as ACK/NACK information), to the base station 200. The feedback data may be processed in the Tx processor 320 and sent back using the transmitters 360(1)-360(k). The data from the base station 200 may be received at a number of receivers 370(1)-370(l) and transferred to a Rx processor 340 structured to estimate the channel response based on received pilot signal(s) and to provide channel estimate(s). The Rx processor 340 may also be structured to detect the MIMO function of the received data and perform further processing 350, such as descrambling, despreading, decoding, etc., of the received data and/or can output the data for further processing. The UE 300 may further comprise a controller 330, connected to a memory 380 for storing program code(s) and/or data, structured to control the operation of the UE 300.

Each of the components of the UE 300—data input 310, Tx processor 320, controller 330, Rx processor 340, further processor 350, transmitters 360(1)-360(k), receivers 370(1)-370(l), and memory 380—may be implemented in hardware, software (including firmware), or in combination of hardware and software such that the UE 300 as a whole is implemented in hardware or in a combination of hardware and software.

Figure 4:
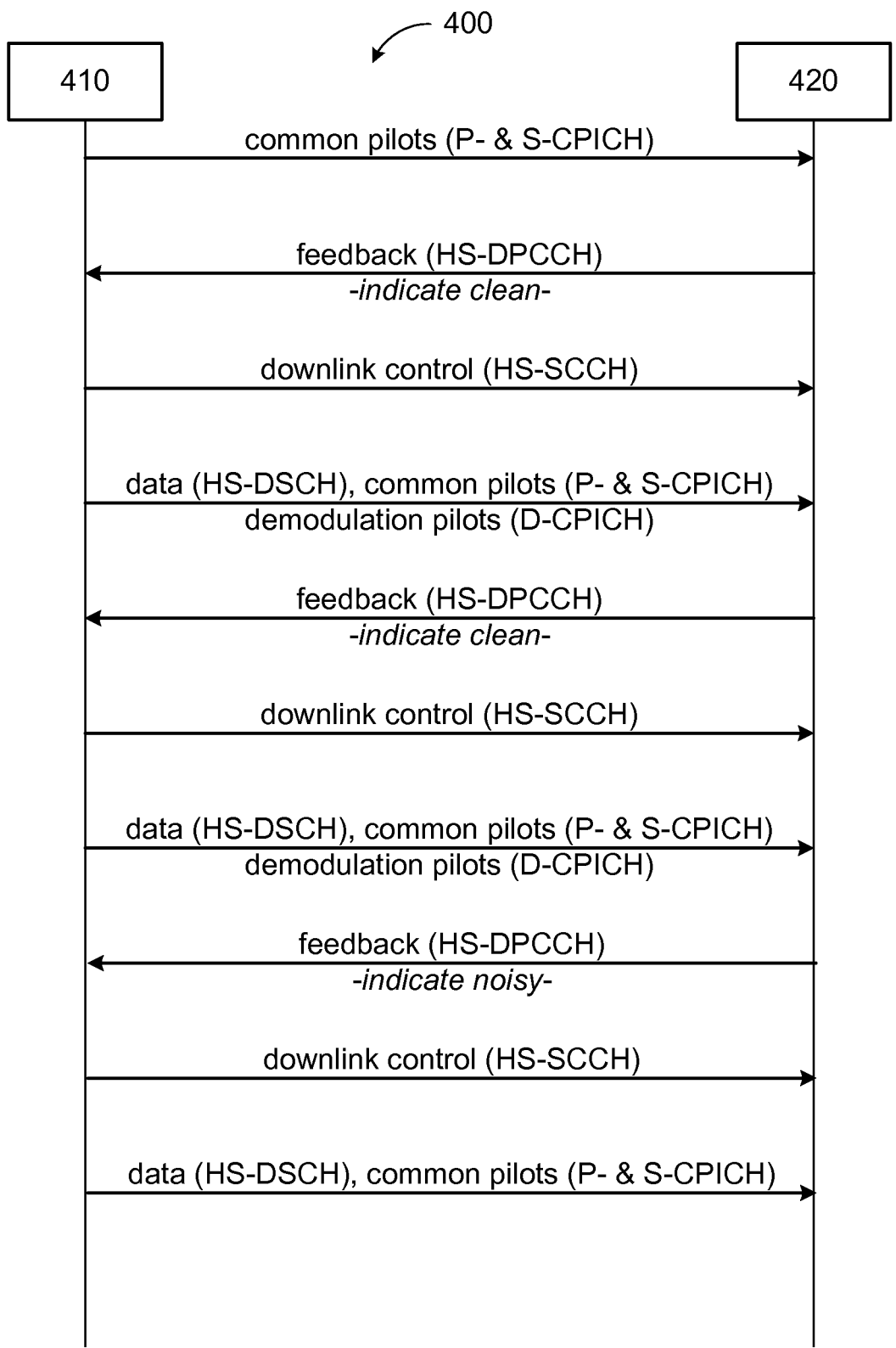
FIG. 4 illustrates an example of messages exchanged between a transmitting node and a receiving node during a call set up.

FIG. 4 illustrates an example sequence of messages exchanged between two nodes—a transmitting node 410 and a receiving node 420—of a multi-antenna wireless communication system 400 according to an aspect of the disclosed subject matter. In the downlink, the transmitting node 410 may be a base station (e.g., eNodeB) and the receiving node 420 may be a wireless terminal (e.g., a UE). In this example, the messages exchanged between an eNodeB and a UE during a typical call set up are illustrated.

From signals transmitted by the eNodeB 410 on common pilot channels (e.g., P-CPICH, S-CPICH), the UE 420 estimates the channel and computes the channel quality information and precoding channel indicator. The UE 420 reports this information along with hybrid ARQ ACK/NAK to the eNodeB 410 as feedback on a feedback channel. For example, once the UE 420 decides about the RI and the corresponding PCI, the information is sent to the eNodeB 410 via the feedback channel (e.g., HS-DPCCH). The periodicity of HS-DPCCH is typically one subframe (2 msec).

Upon receiving the feedback information, the eNodeB 410 decides the rank, modulation, transport block size, and the PCI for the data traffic. This information is conveyed through a downlink control channel (e.g., HS-SCCH). The control information transmitted on the control channel includes scheduling information, i.e., the UE 420 is notified of what downlink resources (any combination of time, frequency, code of data traffic channel (e.g., HS-PDSCH)) has been reserved for the UE 420. After transmitting the control information to the UE 420, the eNodeB 410 then transmits the downlink data to the UE 420 on the data traffic channel.

In this aspect, when transmitting the pilot signals (or reference signals in LTE), the eNodeB 410 always transmits the common pilots. For example in LTE implementing 4×4 MIMO, the eNodeB 410 may transmit four common pilot signals, one from each antenna. The $1^{st}$ and $2^{nd}$ common pilots (e.g., P-CPICH and $1^{st}$ S-CPICH, also respectively referred to as the primary and $1^{st}$ secondary common pilots) may be transmitted at relatively high powers from the first and second antennas respectively (e.g., −10 dB and −13 dB). The $1^{st}$ and $2^{nd}$ common pilots may be understood by both legacy receiving nodes (e.g., 2×2 MIMO capable) as well as non-legacy receiving nodes (e.g., 4×4 MIMO capable). Since these are understood by the legacy receiving nodes, they are also referred to as legacy common pilot signals.

The $3^{rd}$ and $4^{th}$ common pilots (e.g., $2^{nd}$ and $3^{rd}$ S-CPICH, also may be referred to as the $2^{nd}$ and $3^{rd}$ secondary common pilots) may be transmitted from the third and fourth antennas at relatively low powers (e.g., −22 dB). These low power common pilot signals may be understood by non-legacy receiving nodes but not by legacy receiving nodes. Hence, such signals may be referred to as non-legacy common pilot signals.

As indicated above, the non-legacy common pilots are transmitted at relatively low powers since to the legacy nodes, these pilots are not useful, and in fact are interferences. Thus, when legacy terminals are scheduled to receive data from the eNodeB 410, the interfering effects of the non-legacy common pilots should be minimal. However, as explained with respect to FIG. 1, when a non-legacy UE is scheduled to receive data, in certain circumstances, the low power of the non-legacy common pilots can actually be disadvantageous.

But in an aspect of the disclosed subject matter, this problem is addressed through using demodulation pilot signals. For example, assume that the UE 420 in FIG. 4 is a non-legacy receiving node, e.g., is 4×4 MIMO capable. If the feedback from the UE 420 indicates that the UE 420 is in a relatively clean environment (e.g., high SINR, high geometry, etc.), then the eNodeB 410 can provide demodulation pilot signals, in addition to the common pilot signals, to enhance demodulation performance at the UE 420. Prior to providing the demodulation pilot signals, the eNodeB 410 may provide some indication in the downlink control information on the control channel (e.g., HS-SCCH) that the demodulation pilots will be transmitted along with the data on the downlink resources scheduled for the UE 420. The indication may be explicit or implicit (rank, precoding index, MCS, transport block size, etc.). The demodulation pilots can enhance the data demodulation performance of the UE 420.

The number of demodulation pilot signals transmitted can be equal to or less than a number of non-legacy common pilot signals. Preferably, they are equal. Also, each demodulation pilot signal is preferably transmitted from an antenna used to transmit one of the non-legacy common pilot signal. For example, $1^{st}$ and $2^{nd}$ demodulation pilots may be respectively transmitted from the third and fourth antennas used to respectively transmit $3^{rd}$ and $4^{th}$ common pilot signals.

Transmitting the demodulation pilots from the same antennas effectively increases the pilot powers transmitted from those antennas. In FIG. 1, recall that for a non-legacy UE 420 in high geometry (e.g., 20 dB), higher $3^{rd}$ and $4^{th}$ pilot powers significantly enhance throughput, which can be attributed in large part to enhanced data demodulation at the UE 420.

The eNodeB 410 may transmit the demodulation pilots as necessary. For example, while transmitting data to a legacy UE, there would be no need to for the demodulation pilots to be transmitted. Also, even for a non-legacy UE, if the circumstances do not warrant (e.g., UE in dirty environment, type of data to be transmitted does not require high throughput, etc.), there still would not be a need.

However, when the circumstances do warrant, the eNodeB 410 may transmit the demodulation pilots to the UE 420. In an embodiment, the demodulation pilots may be transmitted during the data transmission to allow the UE 420. That is, the UE 420 may assume that the demodulation pilots will be present during the time frame in which the UE 420 is scheduled to receive data. In HSDPA for example, when the demodulation pilots are activated for the UE 420, it may assume that the demodulation pilots will be present in the shared channel TTIs in which the UE 420 is scheduled to receive the shared resources. As an alternative or in addition thereto, the transmission of the demodulation pilots may commence immediately prior to the data transmission so as to allow the UE 420 some preparation opportunity.

In one embodiment, the demodulation pilots may be particularly dedicated to the UE 420. For example, the demodulation pilots may be coded and/or beamformed for the UE 420.

But in another embodiment, the demodulation pilots need not be particularly coded or beamformed for any particular UE. That is, the demodulation pilots may be received over the entire cell (or sector) associated with the eNodeB 410. Also, the demodulation pilots need not be precoded. Further, the demodulation pilots can be scrambled by same scrambling code(s) used to scramble the common pilot signal(s) such as the primary scrambling code.

Note that when the demodulation pilots are transmitted to coincide with the scheduled transmission of data to the UE 420, this effectively dedicates the demodulation pilots to the UE 420. Thus, even if the demodulation pilot signals are not particularly coded or beamformed, the demodulation pilots can be viewed as being dedicated to the UE 420.

It should also be noted the terms "legacy" and "non-legacy" are relative terms and should not be taken to be limited to mean 2×2 and 4×4 MIMO capable apparatuses only. For example, a 4×4 MIMO capable apparatus would be a legacy apparatus from the perspective of an 8×8 MIMO capable apparatus. In this instance, an 8×8 MIMO capable transmitting node may transmit eight common pilots—four of which may be understood by a 4×4 MIMO capable receiving node and four that may not be understood.

As indicated above, the eNodeB 410 is the data transmitting node and the UE 420 is the data receiving node in the downlink. Note that in the uplink, the roles are reversed. That is, the eNodeB is the receiving node and the UE is the transmitting node. It should be noted that some or all aspects of the described subject matter are equally applicable in the uplink.

Figure 5:
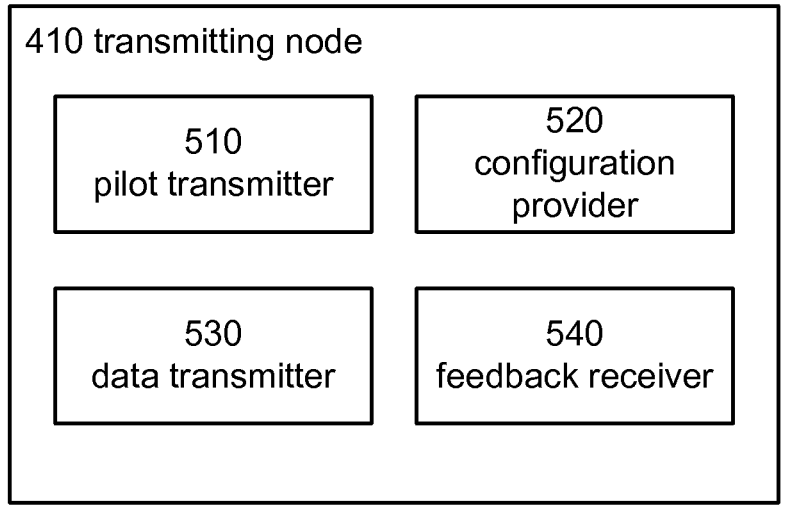
FIGS. 5 and 6 illustrate embodiments of a transmitting node of a wireless network structured to perform multi-antenna transmissions.

FIG. 5 illustrates an embodiment of a transmitting node 410 of a wireless network 400 that is capable of multi-antenna transmission. As seen, the transmitting node 410 may include a pilot transmitter 510, a configuration provider 520, a data transmitter 530 and a feedback receiver 540. FIG. 5 provides a logical view of the transmitting node 410 and the devices included therein. It is not strictly necessary that each device be physically separate from other devices. Some or all devices may be combined in one physical module. Conversely, at least one device may be divided into physically separate modules.

Figure 6:
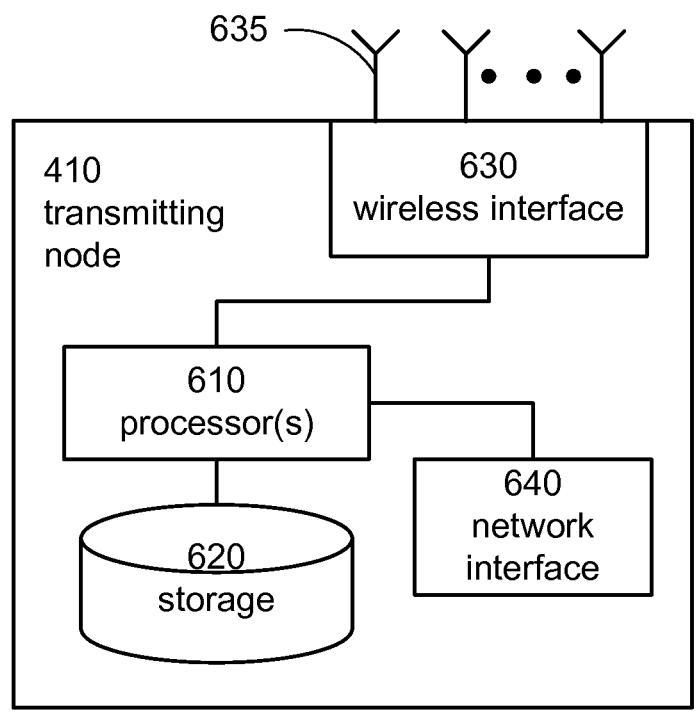

Also, the devices of the transmitting node 410 need not be implemented strictly in hardware. It is envisioned that the devices can be implemented through any combination of hardware and software. For example, as illustrated in FIG. 6, the transmitting node 410 may include one or more processors 610, one or more storage 620, and one or both of a wireless interface 630 and a network interface 640. The processor 610 may be structured to execute program instructions to perform the operations of one or more of the transmitting node devices. The instructions may be stored in a non-transitory storage medium or in firmware (e.g., ROM, RAM, Flash). Note that the program instructions may also be received through wired and/or or wireless transitory medium via one or both of the wireless and network interfaces 630, 640. The wireless interface 630 (e.g., a transceiver) may be structured to receive signals from and send signals to other radio network nodes via one or more antennas 635, which may be internal or external. The network interface 640 may be included and structured to communicate with other radio and/or core network nodes.

Figure 7:
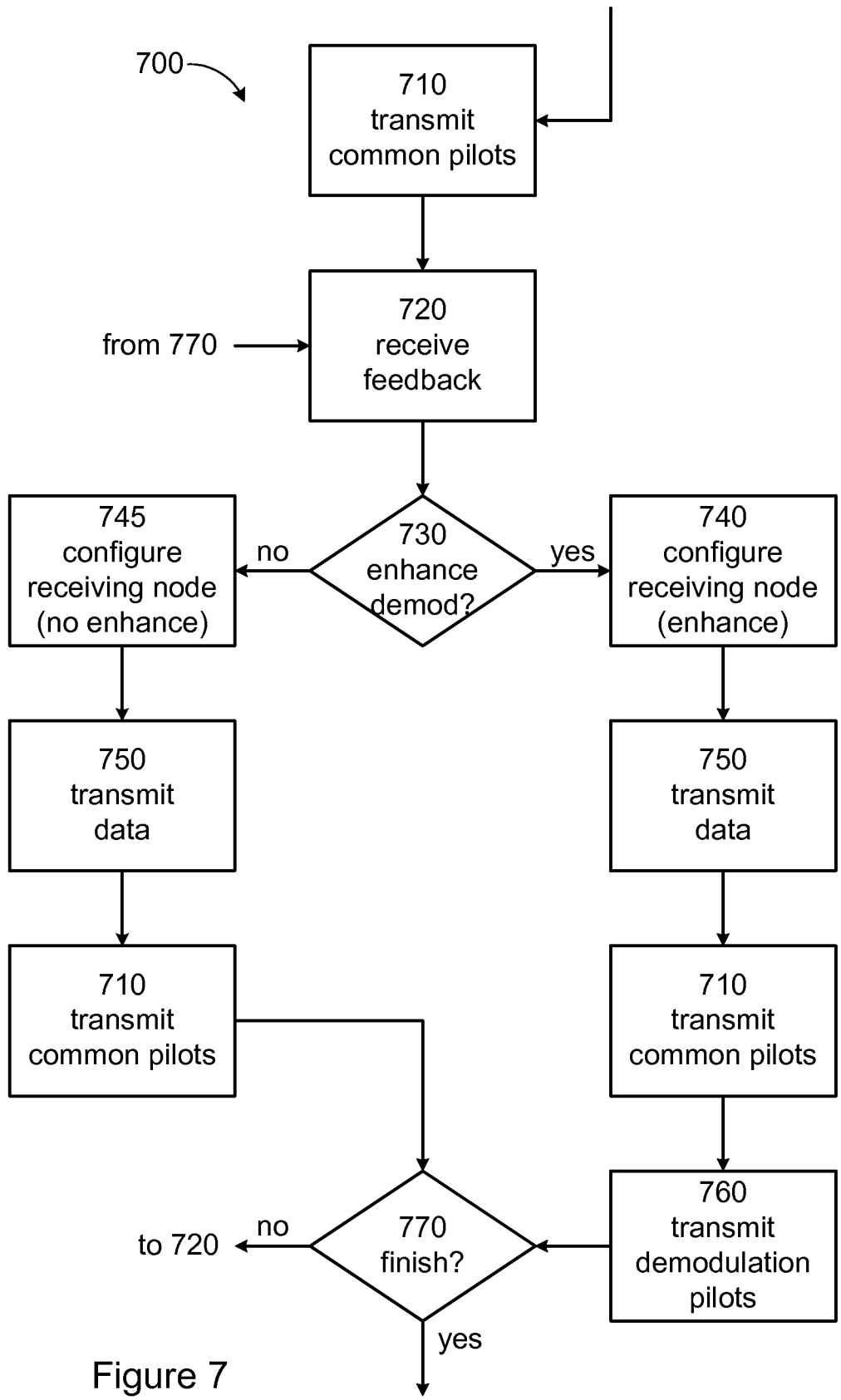
FIG. 7 illustrates a flow chart of an example method for multi-antenna transmissions performed by a transmitting node.

FIG. 7 illustrates a flow chart of an example method 700 performed by the transmitting node 410 to use common and demodulation pilot signals in accordance with one or more of the proposed approaches. In step 710, the pilot transmitter 510 may transmit a plurality of common pilot signals from a plurality of antennas 635. Preferably, each common each common pilot signal is transmitted from one antenna. In one embodiment, no antenna is used to transmit more than one common pilot signal.

The plurality of common pilot signals may include one or more legacy common pilot signals and one or more non-legacy common pilot signals. Preferably, each legacy common pilot signal is transmitted at a higher power than each non-legacy common pilot signal.

Recall that the terms legacy and non-legacy are relative terms. This indicates that the transmitting node 410 may serve at least two types of receiving nodes (can serve more types), and the relationship between these two types is such that one type (e.g., non-legacy) understands a group of common pilot signals (not necessarily all) transmitted by the transmitting node 410 and the other type (e.g., legacy) understands only a subset of the same group. In other words, each legacy common pilot signal may be understood by both legacy and non-legacy receiving nodes. However, each non-legacy common pilot signal is understood by non-legacy receiving nodes but is not understood by legacy receiving nodes.

In step 730, the configuration provider 520 may determine whether data demodulation at the receiving node 420 can be enhanced. In one aspect, the feedback receiver 540 may receive, from the receiving node 420, a feedback based on the plurality of common pilot signals transmitted by the pilot transmitter 510. The feedback preferably includes a channel state information (CSI) of a channel between the transmitting node 410 and the receiving node 420. In an embodiment, the channel state information may include a precoding control indication (also referred to as PMI) and/or a rank indication. Then the configuration provider 520 can determine whether or not the data demodulation at the receiving node 420 can be enhanced based on the channel state information.

When the configuration provider 520 determines that the data demodulation at the receiving node 420 can be enhanced (e.g., high geometry) in step 730, the configuration provider 520 can proceed to configuring the receiving node 420 for enhancement in step 740. On the other hand, when the configuration provider 520 determines that the data demodulation at the receiving node 420 cannot be enhanced (e.g., low geometry) or that enhancement is unnecessary (e.g., scheduled data does not require high throughput), the configuration provider 520 can proceed to configuring the receiving node 420 for no enhancement in step 745.

In an embodiment, regardless of whether the receiving node 420 will be configured for enhancement or not, the data transmitter 530 may transmit the data at a data transmission time scheduled for the receiving node 420 in step 750. Also, the common pilots—legacy and non-legacy—may be transmitted by the pilot transmitter 510 in step 710.

When the configuration provider 520 determines that the data demodulation can be enhanced, then in step 740, the configuration provider 520 can send a configuration message to notify the receiving node 420 to monitor the common and the demodulation pilot signals when the receiving node 420 is scheduled to receive the data transmitted by the data transmitter 530. In an aspect, the configuration provider 520 may send the configuration message to the receiving node 420 over a communication layer above a physical layer, e.g., RLC, RRC, etc.

Alternatively or in addition thereto, the configuration provider 520 may alert the receiving node 420 to monitor the common and demodulation pilot signals by sending the configuration message prior to the data transmission time, for example, over a shared control channel. The configuration message may include a rank of the data transmitted during the data transmission time. The rank indicated in the configuration message may be greater than a legacy threshold rank. The legacy threshold rank may depend on the capability of the receiving node 420. For example, for a 4×4 MIMO capable receiving node, the legacy threshold rank may be 2. For an 8×8 MIMO capable receiving node, there may be two legacy threshold ranks—e.g., 2 and 4.

After the receiving node 420 is alerted to monitor the demodulation as well as the common pilot signals, the pilot transmitter 510 may transmit one or more demodulation pilot signals to the receiving node 420 in step 760. In one aspect, the pilot transmitter 510 may transmit each demodulation pilot signal to coincide with the data transmission time. Preferably, the pilot transmitter 510 transmits each demodulation pilot signal from a same antenna used to transmit one of the non-legacy common pilot signal. More preferably, each antenna used to transmit the non-legacy common pilot signal is used to transmit one of the demodulation pilot signals, i.e., the number of demodulation pilots is preferably equal to the number of non-legacy pilots.

As a specific example, assume that legacy receiving nodes are 2×2 MIMO capable and that the receiving node 420 is 4×4 MIMO capable. Then there may be four common pilot signals—a primary and three secondary common pilots—transmitted by the pilot transmitter 510 in step 710. The primary and $1^{st}$ secondary pilots, transmitted from the first and second antennas respectively, may be understood by the 2×2 MIMO capable receiving nodes as well as the 4×4 MIMO capable node 420. The $2^{nd}$ and $3^{rd}$ second common pilots, transmitted from the third and fourth antennas respectively, may be understood by the 4×4 MIMO capable node 420 but not by any 2×2 MIMO capable nodes. When the configuration provider 520 determines that data demodulation can be enhanced for the 4×4 MIMO capable node 420 in step 730, then the pilot transmitter 510 may transmit the $1^{st}$ and $2^{nd}$ demodulation pilot signals respectively from the third and fourth antennas in step 760.

Note that in step 720, the feedback received from the receiving node 420 may be based on the demodulation signals in addition to the common pilot signals.

Of course, when the configuration provider 520 determines that the data demodulation cannot or need not be enhanced in step 730, then in step 745, the configuration provider 520 can send a configuration message to notify the receiving node 420 to monitor the common pilot signals only. Again, such notification can be through higher layer signaling and/or through control channels. In another embodiment, in the absence of any indication that the demodulation pilots will be transmitted, the receiving node 420 may default to not monitoring.

Figure 8:
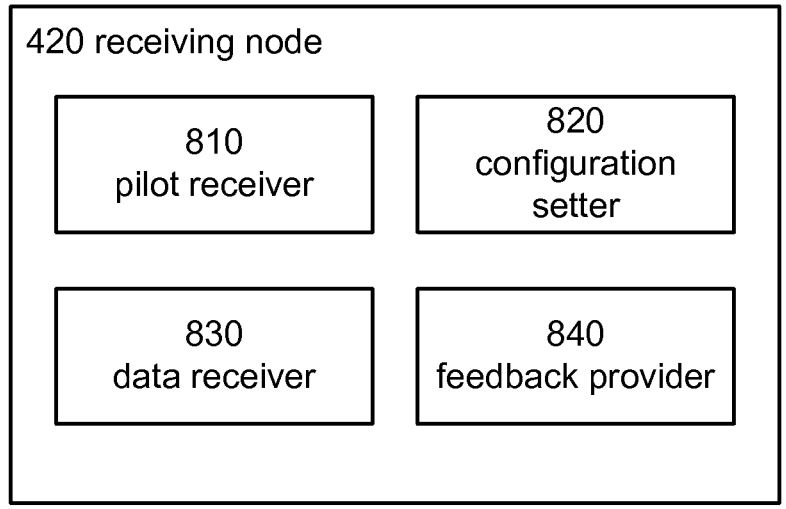
FIGS. 8 and 9 illustrate embodiments of a receiving node of a wireless network structured to perform multi-antenna receptions.

FIG. 8 illustrates an embodiment of a receiving node 420 of a wireless network 400 that is structured to be capable of multi-antenna reception. As seen, the receiving node 420 may include a pilot receiver 810, a configuration setter 820, a data receiver 830 and a feedback provider 840. FIG. 8 provides a logical view of the receiving node 420 and the devices included therein. It is not strictly necessary that each device be physically separate from other devices. Some or all devices may be combined in one physical module. Conversely, at least one device may be divided into physically separate modules.

Figure 9:
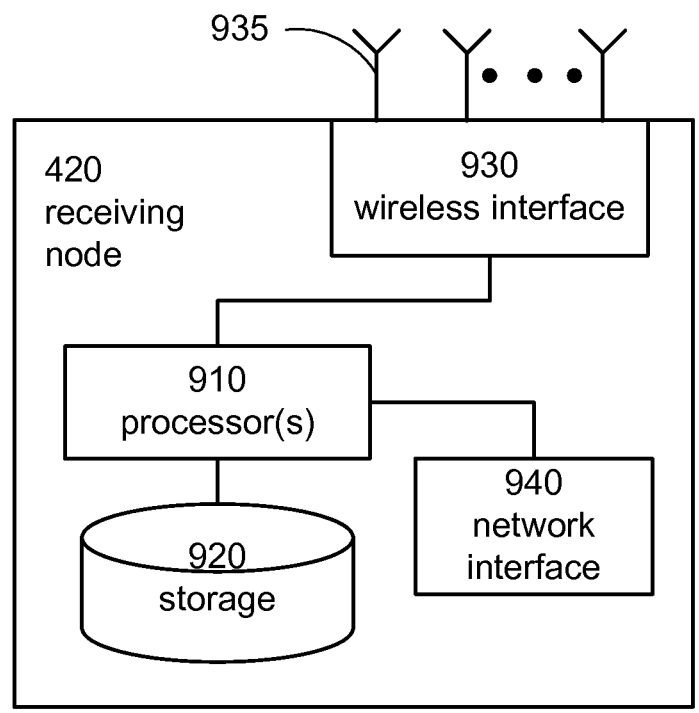

Also, the devices of the receiving node 420 need not be implemented strictly in hardware. It is envisioned that the devices can be implemented through any combination of hardware and software. For example, as illustrated in FIG. 9, the receiving node 420 may include one or more processors 910, one or more storage 920, and one or both of a wireless interface 930 and a network interface 940. The processor 910 may be structured to execute program instructions to perform the operations of one or more of the transmitting node devices. The instructions may be stored in a non-transitory storage medium or in firmware (e.g., ROM, RAM, Flash). Note that the program instructions may also be received through wired and/or or wireless transitory medium via one or both of the wireless and network interfaces 930, 940. The wireless interface 930 (e.g., a transceiver) may be structured to receive signals from and send signals to other radio network nodes via one or more antennas 935, which may be internal or external. The network interface 940 may be included and structured to communicate with other radio and/or core network nodes.

Figure 10:
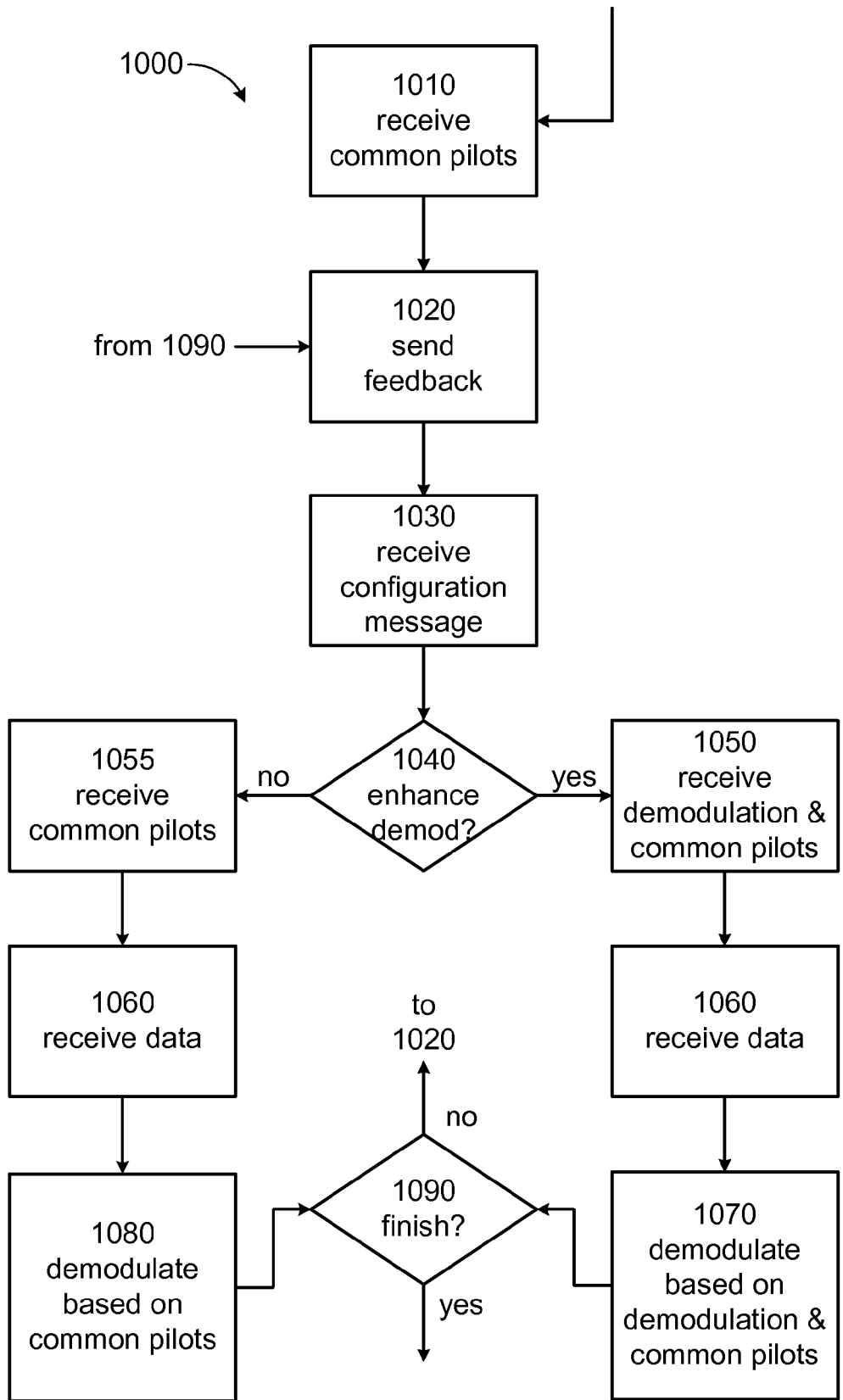
FIG. 10 illustrates a flow chart of an example method for multi-antenna receptions performed by a receiving node.

FIG. 10 illustrates a flow chart of an example method 1000 performed by the receiving node 420 to use common and demodulation pilot signals in accordance with one or more of the proposed approaches. In step 1010, the pilot receiver 810 may receive a plurality of common pilot signals transmitted from the transmitting node 410. The characteristics of the common pilot signals have been described above, and thus will not be repeated here for brevity. It suffices to indicate that the receiving node 420 can be assumed to be a non-legacy node (again, the term being relative) and thus understands both legacy and non-legacy common pilot signals.

In step 1020, the feedback provider 840 may provide a feedback to the transmitting node 410 based on the plurality of common pilot signals received by the pilot receiver 810. As indicated above with respect to FIG. 7, the feedback may include a channel state information of the channel(s) between the transmitting and receiving nodes 410, 420 such as precoding control indication, PMI, and/or rank indication.

In step 1030, the configuration setter 820 may receive a configuration message from the transmitting node 410 prior to a data reception time. The configuration message may indicate whether or not data demodulation pilot signal(s) is(are) to be monitored. In an embodiment, when the configuration message indicates that the demodulation pilot signals should be monitored, configuration setter 820 may determine that the data demodulation can be enhanced. The configuration message can be received via a higher layer signaling from the transmitting node 410. Alternatively or in addition thereto, the configuration setter 820 may listen for a notification over a shared control channel. When the configuration message includes a rank of the data to be received during the data reception time and the rank is greater than the legacy threshold rank, configuration setter 620 may determine that the data demodulation can be enhanced.

In step 1040, the configuration setter 820 may determine whether or not data demodulation can be enhanced at the receiving node 420 based on the configuration message. When the configuration setter 820 determines that the data demodulation can be enhanced, the pilot receiver 810 can proceed to listen for and receive both common and demodulation pilot signals in step 1050. In one embodiment, the demodulation signals can be listened for during the data reception time. On the other hand, when the configuration setter 820 determines that the data demodulation cannot be enhanced, the pilot receiver 810 can proceed to listen for common pilots only in step 1055.

In an embodiment, regardless of whether the demodulation pilot signal(s) are received or not, the data receiver 830 may receive the data at the data transmission time scheduled for the receiving node 420 in step 1060.

When the demodulation pilot signal(s) is(are) received, i.e., when the data demodulation can be enhanced, the data receiver 830 may demodulate the received based on both the common and demodulation pilot signals in step 1070. Also, feedback to the transmitting node 410 can be provided by the feedback provider 840 based on both the common and demodulation pilots.

However, when the demodulation pilot signal(s) is(are) not received, the data receiver 830 may demodulate the received based only on the common pilot signals in step 1080. Note that when the configuration setter 820 indicates that there will be no demodulation enhancement, the pilot receiver 810 may specifically not listen for the demodulation pilot signals. This can save battery power for example.

Again as a specific example, assume that the legacy receiving nodes are 2×2 MIMO capable and the receiving node 420 are 4×4 MIMO capable, and there are four common pilot signals—a primary and three secondary common pilots—transmitted from the transmitting node 410. Then the step 1010 of receiving the plurality of common pilot signals from a may include listening for the legacy common pilots (primary and $1^{st}$ secondary pilots) and also listening for the non-legacy common pilots ($2^{nd}$ and $3^{rd}$ secondary pilots). Also, the step 1050 of receiving the one or more demodulation pilot signals and the one or more common pilot signals comprises may include listening for the $1^{st}$ and $2^{nd}$ demodulation pilots.

Figure 11:
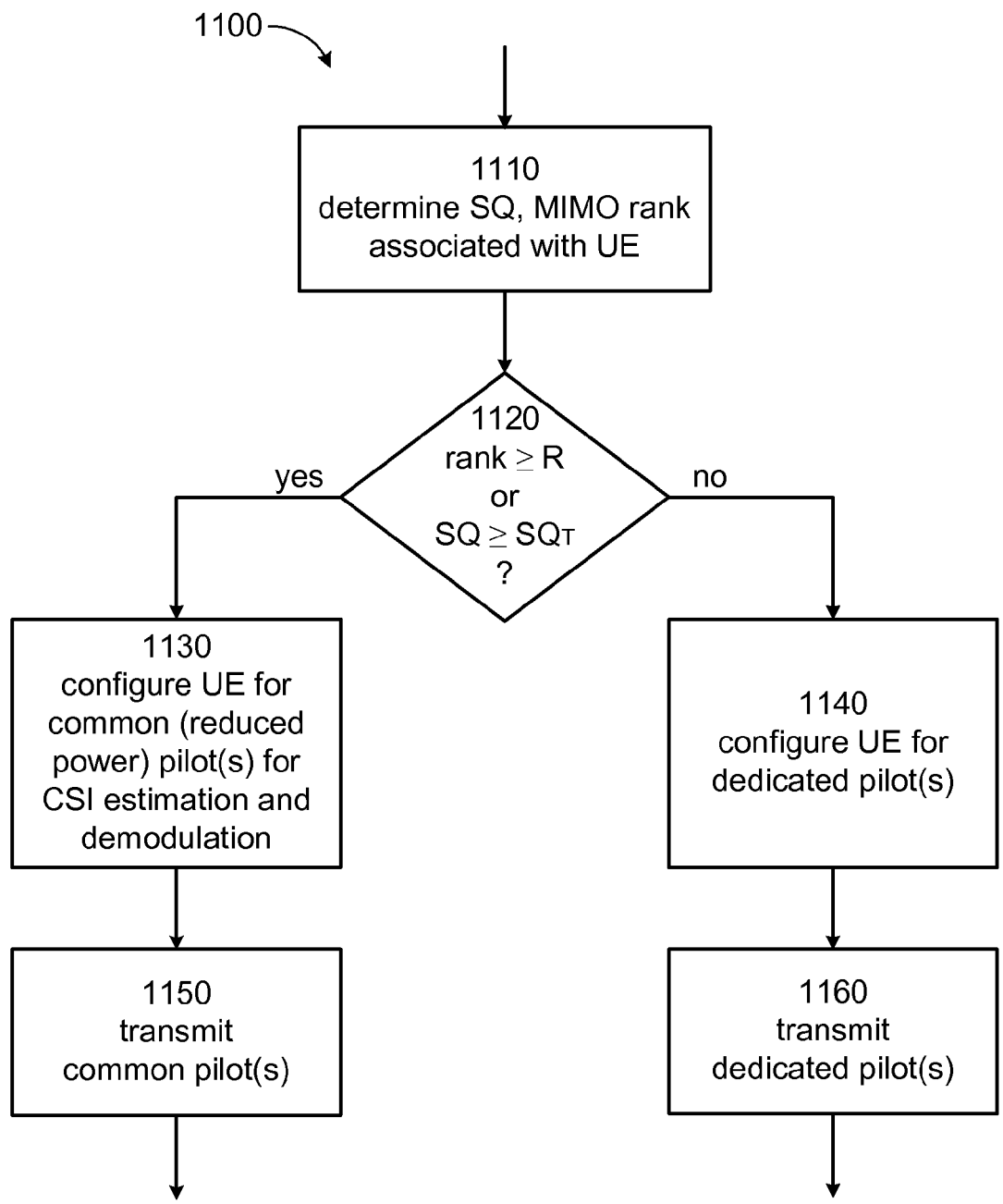
FIGS. 11 and 12 illustrates flow charts of other example methods for multi-antenna transmissions performed by a transmitting node.
Figure 12:
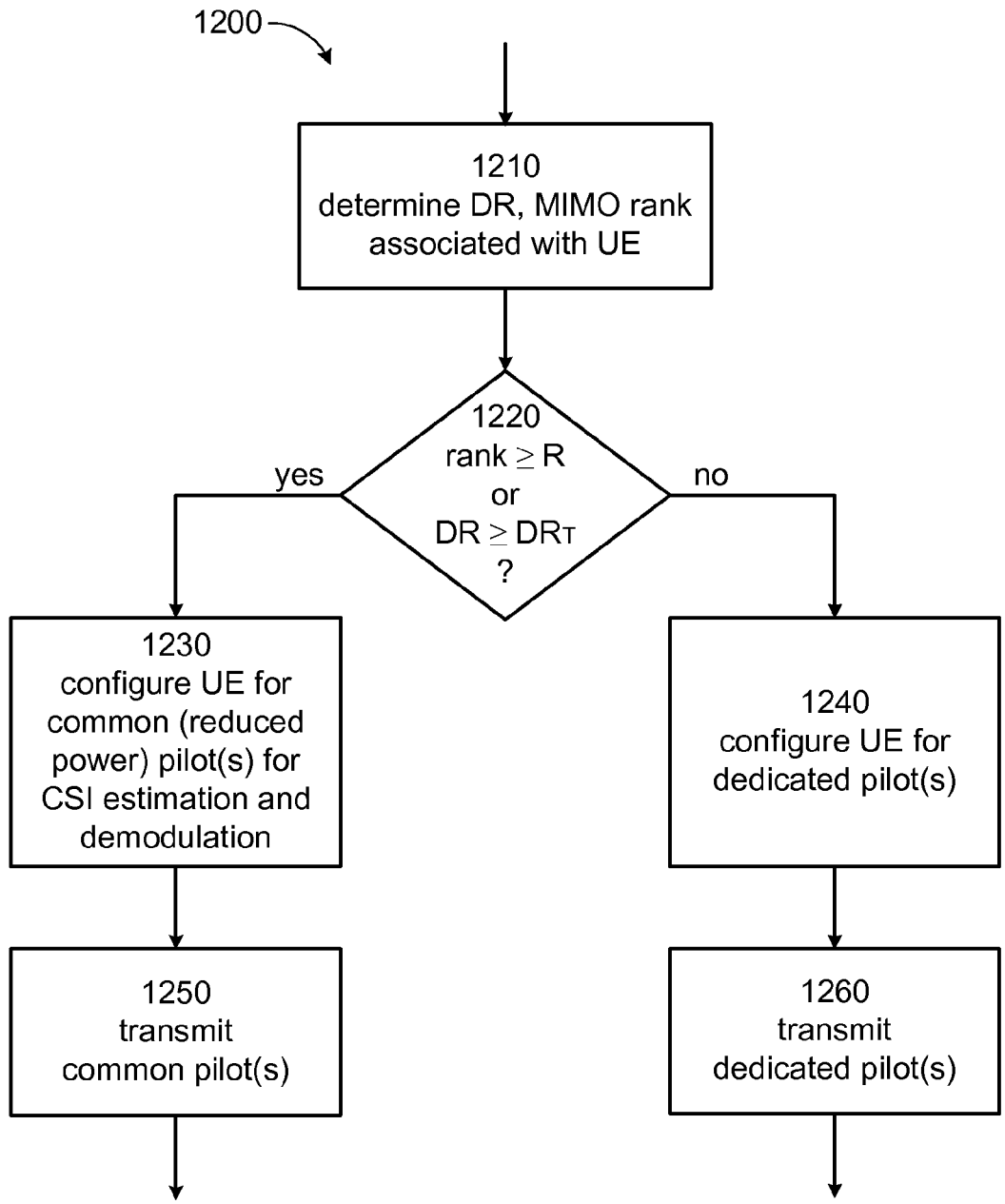

Referring back to FIG. 7, note that there are other ways for the transmitting node 410 to determine whether or not the data demodulation at the receiving node 420 can be enhanced. FIGS. 11 and 12 are flowcharts illustrating non-limiting example procedures that may be performed by a transmitting node such as a radio network node like a base station. In FIG. 11, the base station (e.g., the configuration provider 520) may determine in step 1110 a signal quality (SQ) associated with the UE such as its signal to noise ratio (SNR), geometry (average signal to noise ratio (SNR) or other indicator of path loss), signal to interference to noise ratio (SINR), or any other suitable signal quality measure associated with a communication between the base station and a UE (an example of a receiving node). Example methods to find an SINR/geometry of a particular UE may be based on a set of modulation coding schemes (MCSs) reported by the UE, UE pilot channel measurements, or the like. Also in step 1110, the base station may determine a MIMO rank associated with the UE, i.e., the MIMO capability level of the UE such as the highest number of MIMO antennas that can be used for the MIMO communication.

Then in step 1120, the base station (e.g., the configuration provider 520) may decide the UE's MIMO rank exceeds a predetermined rank R or the determined signal quality (SQ) exceeds a predetermined signal quality threshold $SQ_T$. If so, the base station (e.g., the configuration provider 520) may configure the UE to listen for one or more dedicated pilots on the MIMO channels (step 1140). Thereafter the base station (e.g., the pilot transmitter 510) may transmit the dedicated pilot signals (step 1160). If not, the base station (e.g., the configuration provider 520) may configure the UE to listen for common pilot signal(s) on the MIMO channels (step 1150), and thereafter the base station (e.g., the pilot transmitter 510) may transmit the common pilot signal(s) (step 1150).

In FIG. 12, the base station (e.g., the configuration provider 520) may determine in step 1210 a data rate associated with the UE such as an assigned modulation coding scheme (MCS) or another suitable data rate indicator associated with a communication between the base station and the UE. Also in step 1210, the base station (e.g., the configuration provider 520) may determine a MIMO rank associated with the UE, i.e., what is the MIMO capability level of the UE and the highest number of MIMO antennas that can be used for the MIMO communication.

Then in step 1220, the base station (e.g., the configuration provider 520) may decide whether the UE's MIMO rank exceeds a predetermined rank R or the determined data rate (DR) exceeds a predetermined data rate threshold $DR_T$. If so, the base station (e.g., the configuration provider 520) may configure the UE to listen for dedicated pilot signal(s) on the MIMO channels (step 1240), and thereafter the base station (e.g., the pilot transmitter 510) may transmit the dedicated pilot signals (step 1260). If not, the base station (e.g., the configuration provider 520) may configure the UE to listen for common pilot signal(s) on the MIMO channels (step 1250), and thereafter the base station (e.g., the pilot transmitter 510) may transmit common pilot signals (step 1250).

Figure 13:
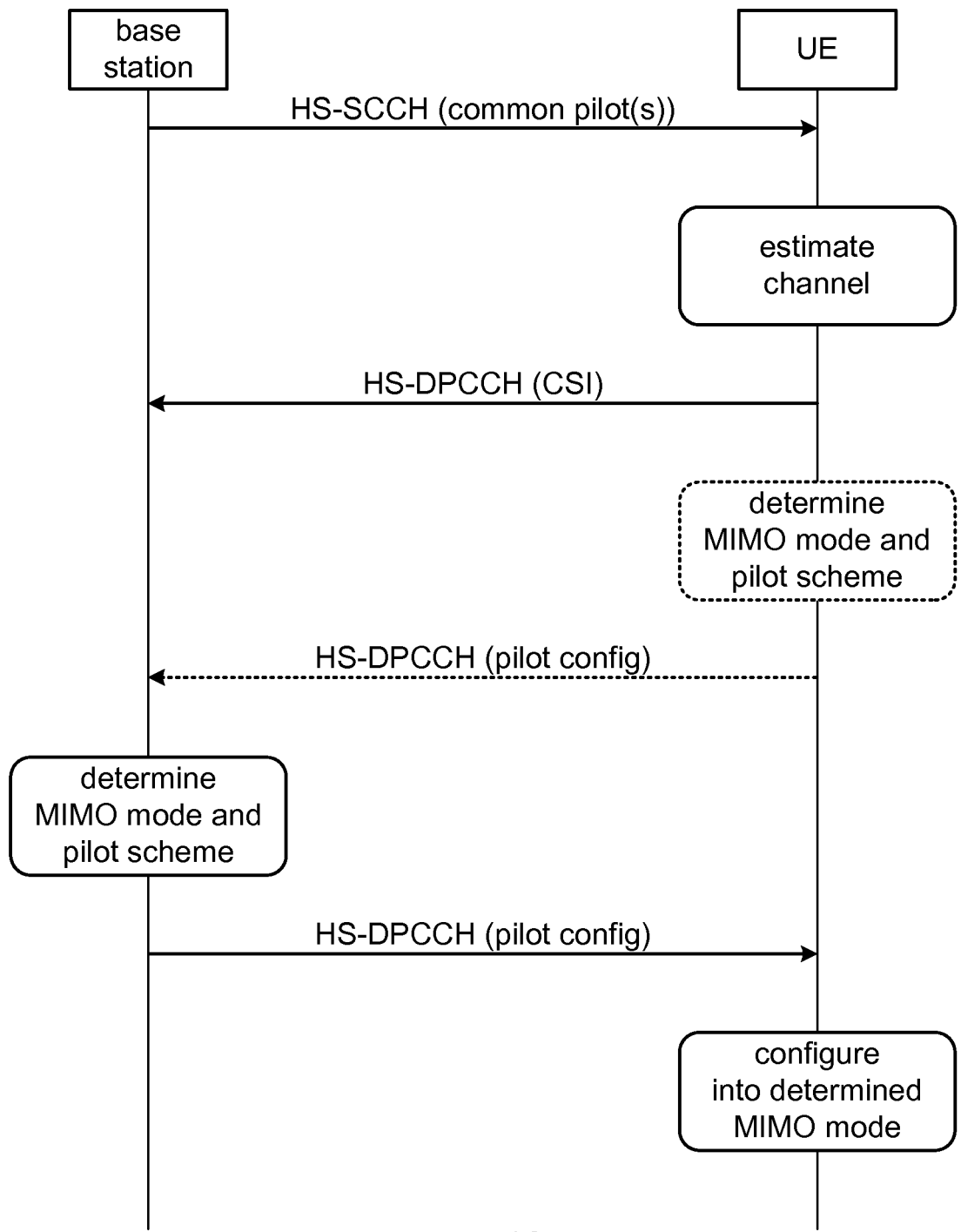
FIG. 13 illustrates a UMTS signaling example between a radio network node and a UE.

The UE pilot configuration may be determined by the UE, but more likely, the UE will be configured based on signaling received from the base station, such as radio resource control (RRC) signaling or as a command. A non-limiting the UMTS-based signaling example shown in FIG. 13. The High Speed-Shared Control Channel (HS-SCCH) is a downlink channel for carrying signaling to the UE including one or more common pilot signals. Based on the common pilot signal(s), the UE may determine one or more radio channel estimates, e.g., CSI, and send the corresponding CSI back to the radio network node, e.g., base station. In UMTS, the radio network node could also be the RNC. In the example shown, the CSI is sent over the High Speed-Dedicated Physical Control Channel HS-DPCCH which may also carry HARQ ACK/NACK or other channel information. From the CSI, the base station may determine a MIMO mode and pilot scheme for the communication with the UE. The base station sends in this example the pilot configuration over the HS-SCCH. The HS-SCCH is typically already used to signal which UE is scheduled to receive a HS-DSCH in a transmission time interval (TTI). The HS-SCCH also signals transport format information and information related to hybrid automatic repeat request (HARQ) for the TTI.

In one example, the pilot configuration information sent over the HS-SCCH may simply be a one bit flag with a 1 meaning one pilot scheme and 0 meaning another pilot scheme. More bits may be sent, e.g., if there are more than two schemes, other MIMO related information needs to be communicated, etc. As one non-limiting example, a 1 might mean use the common pilot for both CSI estimation and data demodulation, and a 0 might mean use the common pilot for CSI estimation and a dedicated pilot for data demodulation. Another embodiment is illustrated in dashed lines with the UE, rather than the base station, determines the MIMO mode and pilot scheme and informs the base station of its MIMO mode and pilot scheme over the HS-PDCCH.

Figure 14:
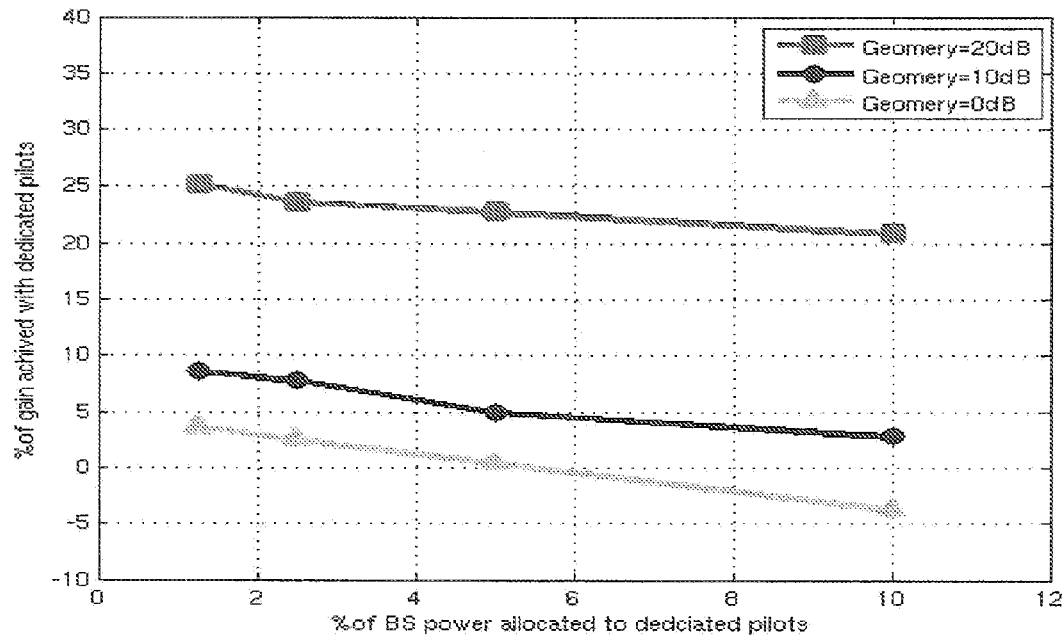
FIGS. 14 and 15 graphically illustrate gains that may be achieved with dedicated pilots for different geometries associated with a UE with differing pilot powers.

In addition to selectively controlling common pilot power levels on different MIMO antennas, the technology may also take into account dedicated pilots. FIG. 14 is a graph that shows example gains that can be achieved with dedicated pilots for different SNRs/geometries associated with the UE plotted against percentage of base station power allocated to dedicated pilots. In the figure, it is assumed that the common pilots are used for CSI estimation with power levels of −10 dB for a primary common pilot on the $1^{st}$ MIMO antenna and −13 dB for pilots on $2^{nd}$, $3^{rd}$, and $4^{th}$ MIMO antennas.

At the highest UE SNR/geometry of 20 dB, it is seen that a significant gain is achieved with dedicated pilots. But at the lower SNRs/geometries of 10 dB and 0 dB, the gains are smaller. In addition, when the dedicated pilot power level is increased, there is a possibility for decreased link throughput because the increase in the dedicated pilot power does not lead to a corresponding increase in demodulation performance; however, the increase in the dedicated pilot power does increase the amount of overhead and reduce the power available for data transmission.

Figure 15:
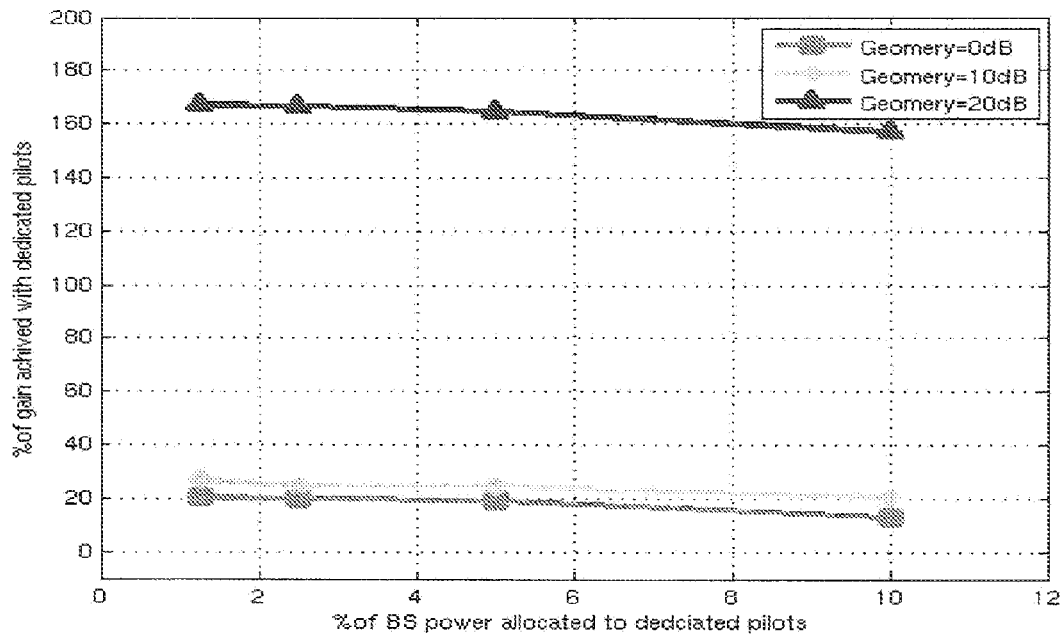

FIG. 15 shows the achievable gains with dedicated pilots on the $3^{rd}$ and $4^{th}$ MIMO antennas when the common pilot power on the $3^{rd}$ and $4^{th}$ antennas is reduced to −22 dB. This provides an upper bound on the achievable gains. Ultimately, simulations in FIGS. 14 and 15 indicate that common pilot option may not be good for all UE SNRs/geometries.

Figure 16:
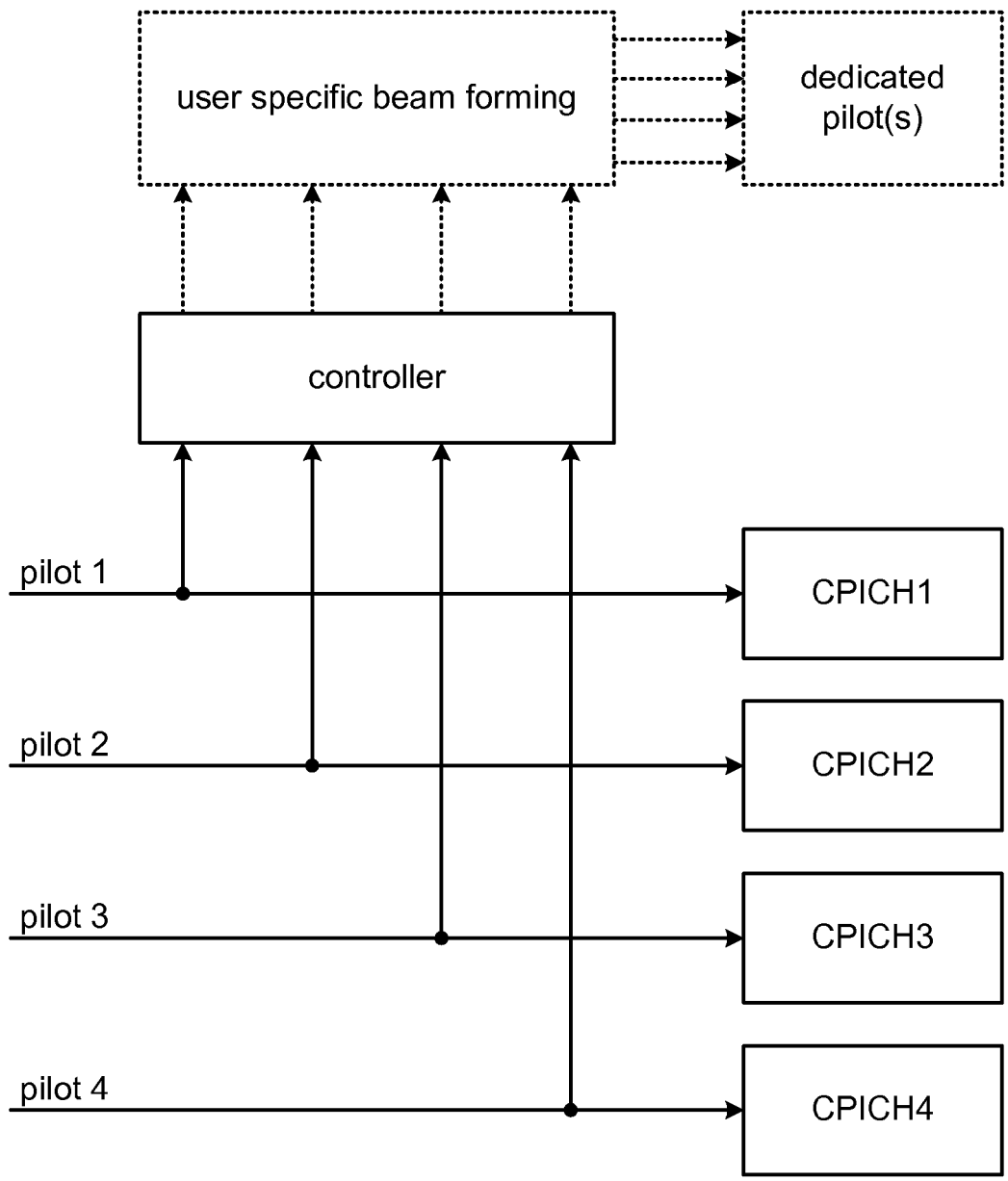
FIGS. 16-18 illustrate embodiments of dedicated pilot signal transmission architectures.
Figure 17:
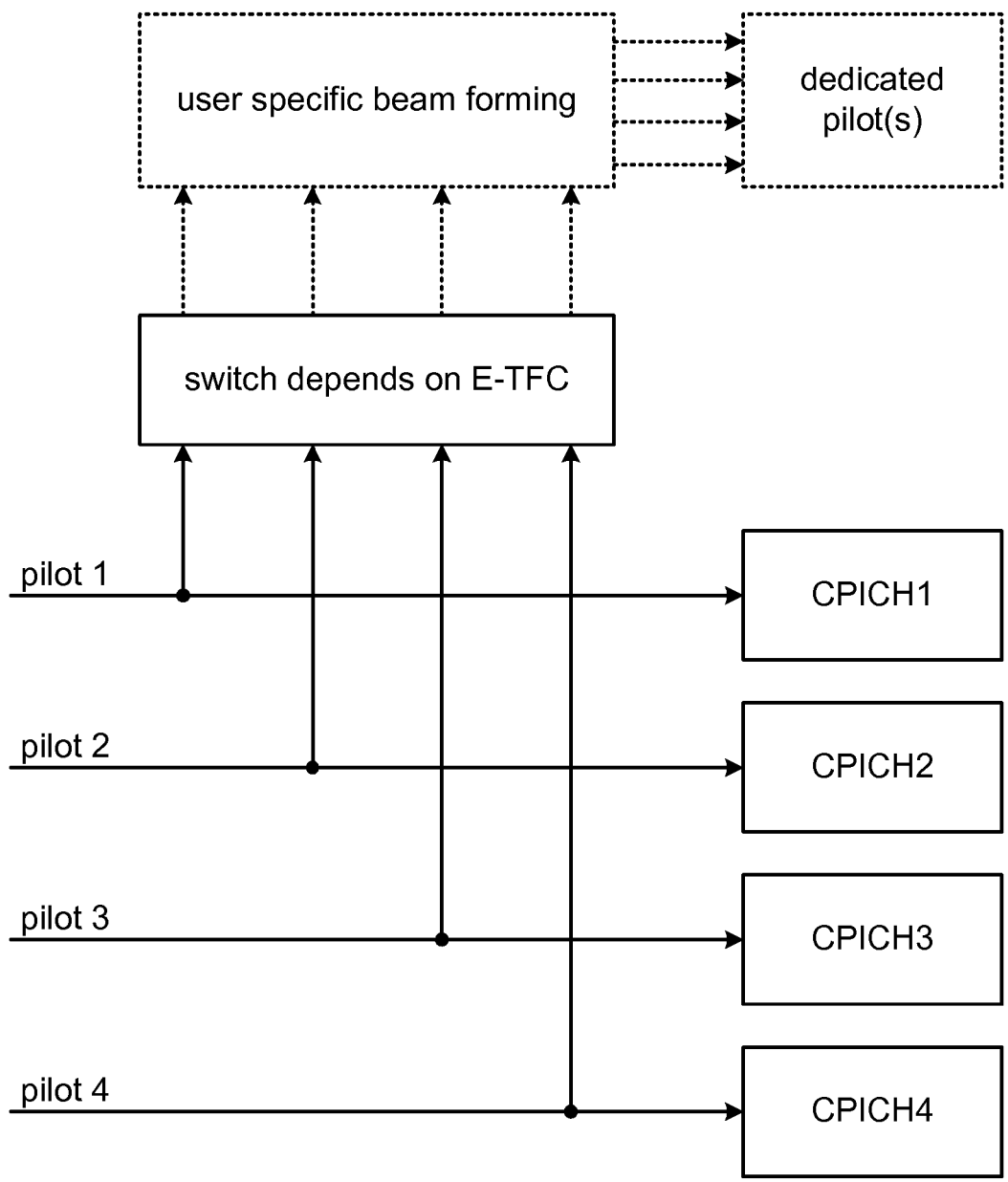
Figure 18:
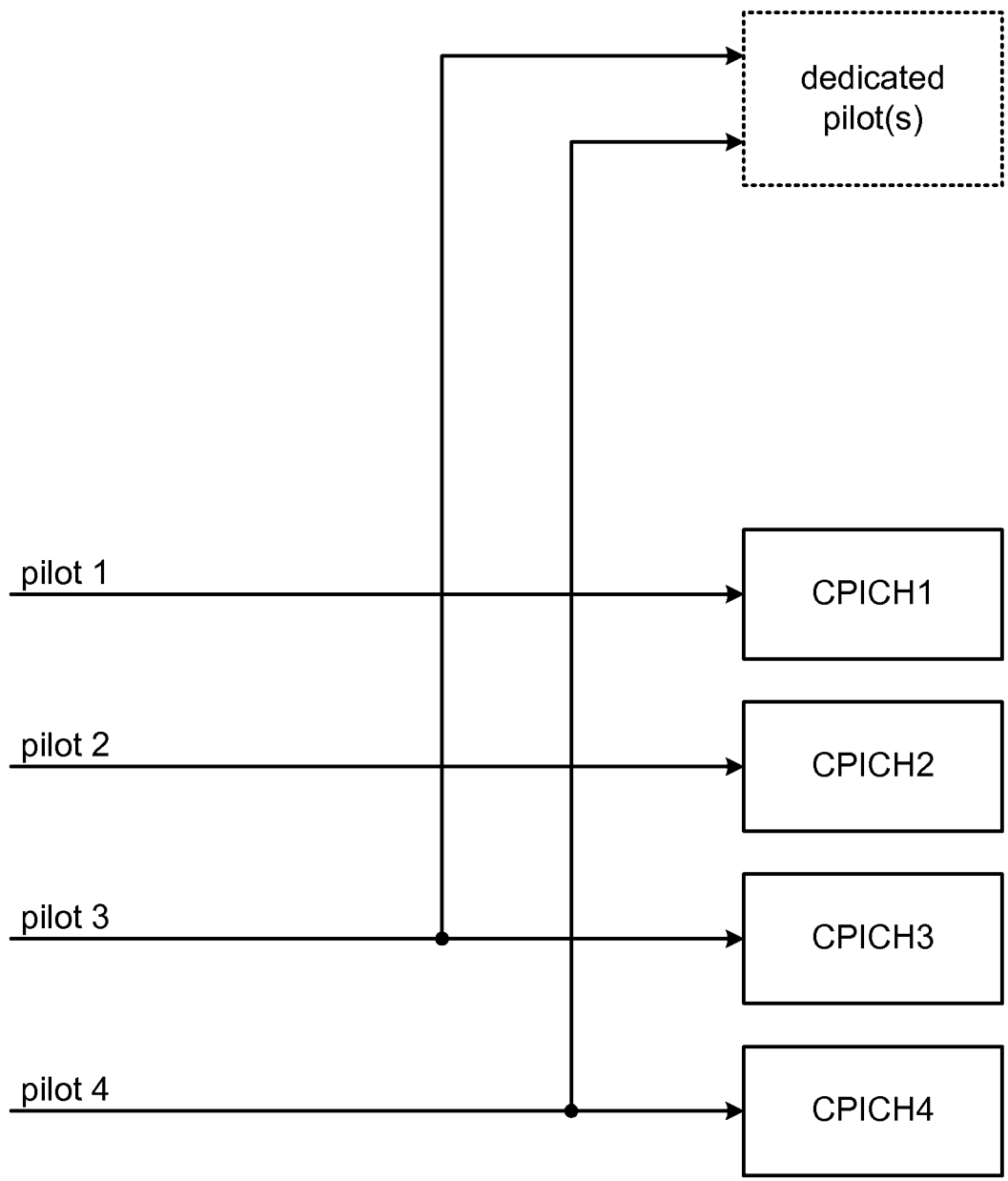

A variety of different example embodiments are now described in conjunction with respect to FIGS. 16-18. FIG. 16 shows an example embodiment where dedicated pilots are unnecessary at lower SNRs/geometries, since low power common pilots provide sufficient pilot power for desired demodulation at the UE. Based on the UE SINRs/geometries, the radio network node can configure the particular UE for common and/or dedicated pilots for data demodulation, e.g., using RRC signaling, HS-SCCH orders, etc. Four common pilots 1-4 may be generated and provided to four MIMO antennas which when transmitted form four pilot channels, CPICHs 1-4 in this example. A controller in the base station can "switch" or select whether one or more of the four pilot signals is(are) transmitted using a corresponding dedicated pilot antenna via a path that incorporates user specific beamforming.

FIG. 17 shows an example embodiment where dedicated pilots may be used for higher UE SNRS/geometries (e.g., 15-30 dB) and/or when higher MIMO ranks (e.g., greater than 2) are scheduled. However, at lower data rates, (e.g., QPSK with low code rates and/or low transport block sizes), dedicated pilots may not be transmitted, and the UE may be expected to use the common pilots for demodulation. As one non-limiting example, the UE may determine whether it should use dedicated pilots based on an MCS indicator on the HS-SCCH.

FIG. 18 illustrates an example embodiment where dedicated pilots are transmitted only from the base station MIMO antennas 3 and 4 while antennas 1 and 2 are used only to transmit common pilots. This embodiment is beneficial in a situation where primary and secondary pilots are detected by the UE as being transmitted with sufficient energy over the $1^{st}$ and $2^{nd}$ base station MIMO antennas for data demodulation by the UE. Lower power common pilots may still be transmitted from antennas 3 and 4 for CSI estimation by the UE.

The UE may combine the common pilot channel estimates from antennas 1 and 2 with additional dedicated pilot channel estimates from antennas 3 and 4 (possibly along with low power common pilots) for data demodulation. Note that the dedicated pilots in this embodiment may not be precoded and/or beamformed in the manner as the embodiments illustrated in FIGS. 16 and 17. That is, the dedicated pilot signal(s) themselves may not be specifically targeted for the UE in that the dedicated pilot signal(s) maybe available cell-wide. But when they are transmitted to coincide with transmission of data to the scheduled UE, they can be much like the demodulation pilots described above. Also, such dedicated pilots would reduce the overhead impact since energy transmitted on antennas 1 and 2 would not be replicated.

The technology offers many benefits. For example, the adverse impact of higher MIMO rank, e.g., 4 TX MIMO, on legacy UEs arising from the need for additional pilots can be reduced while at the same time providing higher power pilots to the UE to enable successful data demodulation by the UE.

There are many advantages associated with one or more aspects of the disclosed subject matter. A non-exhaustive list of advantages include:

Reduction of adverse impact of higher MIMO rank, e.g., 4Tx MIMO, on legacy nodes arising from the need for additional pilots; and At the same time, providing higher power pilots to higher MIMO rank nodes to enable successful data demodulation.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed by a transmitting node of a wireless communication system, the transmitting node being capable of multi-antenna transmission, the method comprising:
   transmitting a plurality of common pilot signals from a plurality of antennas such that each common pilot signal is transmitted from one antenna and no antenna transmits more than one common pilot signal, the plurality of common pilot signals including one or more legacy common pilot signals and one or more non-legacy common pilot signals, each legacy common pilot signal being transmitted at a higher power than each non-legacy common pilot signal;
   transmitting data to the receiving node during a data transmission time; and
   transmitting one or more demodulation pilot signals to the receiving node in response to determining that data demodulation at the receiving node can be enhanced.

2. The method of claim 1, wherein transmitting the one or more demodulation pilot signals to the receiving node comprises transmitting each demodulation pilot signal to coincide with the data transmission time.

3. The method of claim 1, wherein transmitting the one or more demodulation pilot signals to the receiving node comprises transmitting each demodulation pilot signal from a same antenna used to transmit one of the non-legacy common pilot signals.

4. The method of claim 1, further comprising sending a configuration message to the receiving node when it is determined that the data demodulation at the receiving node can be enhanced, wherein the configuration message notifies the receiving node to monitor the common and the demodulation pilot signals, and wherein the configuration message is sent over one or both of a communication layer above a physical layer, and a shared control channel.

5. The method of claim 4, wherein the configuration message is sent prior to the data transmission time, and wherein the configuration message includes a rank of the data transmitted during the data transmission time, the rank being greater than a legacy threshold rank.

6. The method of claim 1, further comprising receiving from the receiving node a feedback based on the plurality of common pilot signals transmitted from the transmitting node, the feedback including a channel state information of a channel between the transmitting node and the receiving node, wherein the step of determining whether or not the data demodulation at the receiving node can be enhanced comprises determining whether or not the data demodulation at the receiving node can be enhanced based on the channel state information, and wherein the channel state information includes a precoding control indication and a rank indication.

7. The method of claim 6, wherein the feedback is based on the demodulation pilot signal(s) in addition to the plurality of common pilot signals.

8. The method of claim 1, wherein the legacy common pilot signals comprise a primary and first secondary pilot signals and transmitting the plurality of common pilot signals comprises transmitting the primary and the first secondary common pilot signals respectively from first and second antennas, wherein the non-legacy common pilot signals comprise second and third secondary pilot signals and transmitting the plurality of common pilot signals further comprises transmitting the second and third secondary common pilot signals respectively from third and fourth antennas, and wherein the demodulation pilot signals comprise first and second demodulation pilot signals and transmitting the demodulation pilot signals comprises transmitting the first and second demodulation pilot signals respectively from the third and fourth antennas.

9. A method performed by a receiving node of a wireless communication system, the receiving node being capable of multi-antenna reception, the method comprising:
   receiving a plurality of common pilot signals from a transmitting node;
   determining that data demodulation can be enhanced at the receiving node;
   receiving one or more demodulation pilot signals and one or more common pilot signals from the transmitting node in response to determining that the data demodulation at the receiving node can be enhanced;
   receiving data from the transmitting node during a data reception time; and
   demodulating the received data based on the demodulation pilot signal(s) and the common pilot signal(s) when the demodulation pilot signal(s) are received;
   wherein the plurality of common pilot signals includes one or more legacy common pilot signals and one or more non-legacy common pilot signals, each legacy common pilot signal being transmitted at a higher power than each non-legacy common pilot signals.

10. The method of claim 9, wherein receiving the common pilot signal(s) and the demodulation pilot signal(s) from the transmitting node comprises listening for the demodulation pilot signal(s) during the data reception time.

11. The method of claim 9, further comprising receiving a configuration message from the transmitting node over one or both of a communication layer above a physical layer, and a shared control channel, wherein determining that data demodulation can be enhanced at the receiving node comprises determining that the data demodulation can be enhanced in response to the configuration message indicating that the data demodulation pilot signal(s) are to be monitored.

12. The method of claim 11, wherein the configuration message is received prior to the data reception time, wherein the configuration message includes a rank of the data received during the data reception time, and wherein determining that data demodulation can be enhanced at the receiving node comprises determining that the data demodulation pilot signal(s) are to be monitored when the rank is greater than a legacy threshold rank.

13. The method of claim 9, further comprising sending a feedback to the transmitting node based on the plurality of common pilot signals received from the transmitting node, the feedback including a channel state information of a channel between the transmitting node and the receiving node, wherein the channel state information includes a precoding control indication and a rank indication.

14. The method of claim 13, wherein the feedback is based on the demodulation pilot signal(s) in addition to the common pilot signal(s).

15. The method of claim 9, wherein the legacy common pilot signals comprise a primary and first secondary pilot signals and receiving the plurality of common pilot signals comprises listening for the primary and the first secondary common pilot signals, wherein the non-legacy common pilot signals comprise second and third secondary pilot signals and receiving the plurality of common pilot signals further comprises listening for the second and third secondary common pilot signals, and wherein the demodulation pilot signals comprise first and second demodulation pilot signals and receiving the demodulation pilot signals and the common pilot signals comprises listening for the first and second demodulation pilot signals.

* * * * *